(12) United States Patent
Yang et al.

(10) Patent No.: US 8,259,411 B2
(45) Date of Patent: Sep. 4, 2012

(54) FABRICATION OF TRAPEZOIDAL POLE FOR MAGNETIC RECORDING

(75) Inventors: XiaoMin Yang, Sewickley, PA (US); Shuaigang Xiao, Pittsburgh, PA (US); Jie Gong, Eden Prairie, MN (US); Michael Seigler, Pittsburgh, PA (US)

(73) Assignee: Seagate Technology LLC, Cupertino, CA (US)

( * ) Notice: Subject to any disclaimer, the term of this patent is extended or adjusted under 35 U.S.C. 154(b) by 979 days.

(21) Appl. No.: 12/116,798

(22) Filed: May 7, 2008

(65) Prior Publication Data

US 2009/0279206 A1  Nov. 12, 2009

(51) Int. Cl.
*G11B 5/127* (2006.01)

(52) U.S. Cl. ............... 360/125.13; 360/125.51

(58) Field of Classification Search ............ 360/125.01–125.03, 125.09, 125.13, 125.33, 125.46, 125.59
See application file for complete search history.

(56) References Cited

U.S. PATENT DOCUMENTS

| | | | |
|---|---|---|---|
| 5,103,553 A * | 4/1992 | Mallary ...................... | 29/603.13 |
| 6,043,960 A * | 3/2000 | Chang et al. .................. | 360/317 |
| 6,342,311 B1 * | 1/2002 | Inturi et al. ................. | 428/815.2 |
| 6,385,008 B1 * | 5/2002 | Santini et al. ............ | 360/125.64 |
| 6,631,054 B2 * | 10/2003 | Miyazaki et al. ............. | 360/317 |
| 6,809,899 B1 | 10/2004 | Chen et al. | |
| 6,813,116 B2 * | 11/2004 | Nakamura et al. ....... | 360/125.12 |
| 6,891,697 B2 * | 5/2005 | Nakamura et al. ....... | 360/125.12 |
| 6,995,949 B2 * | 2/2006 | Nakamura et al. ....... | 360/125.13 |
| 7,102,854 B2 | 9/2006 | Wang et al. | |
| 7,186,348 B2 | 3/2007 | Chen et al. | |
| 7,233,457 B2 | 6/2007 | Johnston et al. | |
| 7,464,457 B2 * | 12/2008 | Le et al. ..................... | 29/603.16 |
| 7,609,478 B2 * | 10/2009 | Han et al. ................. | 360/125.12 |
| 7,639,451 B2 * | 12/2009 | Yatsu et al. ............. | 360/125.09 |
| 7,710,685 B2 * | 5/2010 | Kimura et al. ........... | 360/125.09 |
| 7,872,831 B2 * | 1/2011 | Hirata et al. ............. | 360/125.21 |
| 8,004,794 B2 * | 8/2011 | Zhou et al. ............... | 360/125.31 |
| 2003/0128633 A1 | 7/2003 | Batra et al. | |
| 2004/0120074 A1 * | 6/2004 | Okada et al. .................. | 360/126 |
| 2004/0150910 A1 * | 8/2004 | Okada et al. .................. | 360/125 |

(Continued)

OTHER PUBLICATIONS

Xiaomin Yang, Andrew Eckert, Keith Mountfield, Harold Gentile, Carl Seiler, Stanko Brankovic, and Earl Johns, Fabrication of sub-50 nm critical feature for magnetic recording device using electron-beam lithography, American Vacuum Society, pp. 3017-3020, J. Vac. Sci. Technol. B 21(6), Nov./Dec. 2003.

(Continued)

*Primary Examiner* — Will J Klimowicz
(74) *Attorney, Agent, or Firm* — HolzerIPLaw, PC

(57) ABSTRACT

A method for forming a magnetic write pole with a trapezoidal cross-section is described. The method consists of first forming a magnetic seedlayer on a base followed by depositing a removable material layer on the seedlayer, and then a resist layer on the removable material layer. A trench is then formed in the resist, and the resist is heated to cause the cross-sectional profile of the trench to assume a trapezoidal shape. The resist is then capped with another resist layer and further heated to cause the width of the trapezoidal trench to become narrower. The cap layer and removable material layer at the bottom of the trench are then removed and the trench filled with magnetic material by electroplating. The resist and seedlayer external to the trench are finally removed to form a write pole with a trapezoidal cross-section.

33 Claims, 17 Drawing Sheets

U.S. PATENT DOCUMENTS

| | | | |
|---|---|---|---|
| 2004/0223258 A1 | 11/2004 | Giorgis et al. | |
| 2005/0024771 A1 | 2/2005 | Le | |
| 2005/0057853 A1* | 3/2005 | Nakamura et al. | 360/125 |
| 2005/0066517 A1 | 3/2005 | Bedell et al. | |
| 2005/0068665 A1* | 3/2005 | Le et al. | 360/97.01 |
| 2005/0185335 A1* | 8/2005 | Nakamura et al. | 360/125 |
| 2005/0219745 A1 | 10/2005 | Hixson-Goldsmith et al. | |
| 2006/0154110 A1 | 7/2006 | Hohlfeld et al. | |
| 2006/0221497 A1* | 10/2006 | Okada et al. | 360/125 |
| 2007/0134597 A1 | 6/2007 | Lauchlan | |
| 2007/0195454 A1* | 8/2007 | Kimura et al. | 360/126 |
| 2009/0052092 A1* | 2/2009 | Zhou et al. | 360/313 |

OTHER PUBLICATIONS

Keiichi Nagasaka, Yoshihiko Seyama, Reiko Kondo, Hirotaka Oshima, Yutaka Shimizu, and Atsushi Tanaka, CPP Operational Mode of GMR Head, Fujitsu Sci. Tech. J.,37,2,p. 192-200(Dec. 2001).

Michael A. Seigler, William A. Challener, Edward Gage, Nils Gokemeijer, Bin Lu, Kalman Pelhos, Chubbing Peng, Robert E. Rottmayer, Xiaomin Yang, Hua Zhou, Xiaobin Zhu, and Tim Rausch, Heat Assisted Magnetic Recording with a Fully Integrated Recording Head, Optical Data Storage 2007, Edited by Bell, Bernard, Shimano, Takeshi, Proceedings of the SPIE, vol. 6620, pp. 66200P (2007).

* cited by examiner

Laminate 1000A

ELECTROPLATE TO FORM MAGNETIC TRAPEZOIDAL POLE

FABRICATION OF TRAPEZOIDAL POLE FOR MAGNETIC RECORDING

STATEMENT OF GOVERNMENT INTEREST

This invention was made with United States Government support under Agreement No. 70NANB1H3056 awarded by the National Institute of Standards and Technology (NIST). The United States Government has certain rights in the invention.

FIELD OF THE INVENTION

The invention relates to magnetic recording heads and more particularly to the fabrication of a trapezoidal write pole.

BACKGROUND

Magnetic recording heads have utility in a magnetic disc drive storage system. Most magnetic recording heads used in such systems today are "longitudinal" magnetic recording heads. Longitudinal magnetic recording in its conventional form has been projected to suffer from superparamagnetic instabilities at densities above approximately 40 Gbit/in$^2$. It is believed that reducing or changing the bit cell aspect ratio will extend this limit up to approximately 100 Gbit/in$^2$. However, for recording densities above 100 Gbit/in$^2$, different approaches will likely be necessary to overcome the limitations of longitudinal magnetic recording.

An alternative to longitudinal recording that overcomes at least some of the problems associated with the superparamagnetic effect is "perpendicular" magnetic recording. Perpendicular magnetic recording is believed to have the capability of extending recording densities well beyond the limits of longitudinal magnetic recording. Perpendicular magnetic recording heads for use with a perpendicular magnetic storage medium may include a pair of magnetically coupled poles, including a main write pole having a relatively small bottom surface area and a flux return pole having a larger bottom surface area. A coil having a plurality of turns is located adjacent to the main write pole for inducing a magnetic field between the pole and a soft underlayer of the storage media. The soft underlayer is located below the hard magnetic recording layer of the storage media and enhances the amplitude of the field produced by the main pole. This in turn allows the use of storage media with higher coercive force. Consequently, more stable bits can be stored in the media. In the recording process an electrical current in the coil energizes the main pole, which produces a magnetic field. The image of this field is produced in the soft underlayer to enhance the field strength produced in the magnetic media. The flux density that diverges from the tip into the soft underlayer returns through the return flux pole. The return pole is located sufficiently far apart from the main write pole such that the material of the return pole does not affect the magnetic flux of the main write pole, which is directed vertically into the hard layer and the soft underlayer of the storage media.

A magnetic recording system such as, for example, a perpendicular magnetic recording system may utilize a write pole with a square or rectangular cross-section. Under certain circumstances, the increased magnetic field concentration at the sharp corners can cause writing or erasure on adjacent tracks.

Another development that overcomes at least some of the problems associated with the superparamagnetic effect is heat assisted magnetic recording (HAMR), sometimes referred to as optical or thermal assisted recording. Heat assisted magnetic recording generally refers to the concept of locally heating a recording medium to reduce the coercivity of the recording medium so that the applied magnetic writing field can more easily direct the magnetization of the recording medium during the temporary magnetic softening of the recording medium caused by the heat source. The heat assisted magnetic recording allows for the use of small grain media, which is desirable for recording at increased aerial densities, with a larger magnetic anisotropy at room temperature and assuring a sufficient thermal stability.

More specifically, super paramagnetic instabilities become an issue as the grain volume is reduced in order to control media noise for high aerial density recording. The superparamagnetic effect is most evident when the grain volume V is sufficiently small that the inequality $K_uV/k_bT>40$ can no longer be maintained. $K_u$ is the magnetic crystalline anisotropy energy density of the material, $k_b$ is Boltzman's constant, and T is absolute temperature. When this inequality is not satisfied, thermal energy demagnetizes the individual grains and the stored data bits will not be stable. Therefore, as the grain size is decreased, in order to increase the aerial density, a threshold is reached for a given material $K_u$ and temperature T such that stable data storage is no longer feasible.

The thermal stability can be improved by employing a recording medium formed of a material with a very high $K_u$. However, with the available materials, the recording heads are not able to provide a sufficient or high enough magnetic writing field to write on such a medium. Accordingly, it has been proposed to overcome the recording head field limitations by employing thermal energy to heat a local area on the recording medium before or at about the time of applying the magnetic write field to the medium. By heating the medium, the $K_u$ or the coercivity is reduced such that the magnetic write field is sufficient to write to the medium. Once the medium cools to ambient temperature, the medium has a sufficiently high value of coercivity and assures thermal stability of the recorded information. When applying a heat or light source to the medium, it is desirable to confine the heat or light to the track where writing is taking place, and to generate the write field in close proximity to where the medium is heated to accomplish high aerial density recording. The separation between the heated spot and the write field spot should be minimal or as small as possible so that the writing may occur while the medium temperature is substantially above ambient temperature. This also provides for the efficient cooling of the medium once the writing is completed.

Accordingly, there is identified a need for an improved write pole with a shape and dimensions that overcome the limitations and shortcomings of known magnetic recording heads and heat assisted magnetic recording heads.

SUMMARY

In one aspect of the invention, a method of forming a magnetic write pole with a trapezoidal cross-section is presented. The method comprises forming a magnetic seedlayer on a base, forming a removable material layer on the seedlayer, forming a resist layer on the removable layer and forming a trench in the resist and heating the structure for a first amount of time at a first temperature to form a predetermined slope in the first and second sidewalls of the trench. The method further comprises capping the trench with another resist layer and heating the capped trench for a second amount of time at a second temperature to shrink the separation of the first and second sidewalls of the trench, removing the cap layer and the removable material at the bottom of the trench, electroplating a magnetic material in the trench and removing the resist by stripping the resist and finally removing the seed material outside the pole area by ion-beam etching to form the magnetic pole.

In accordance with another aspect of the invention, a magnetic write pole with a multilayer structure and a trapezoidal cross-section comprises a base and a multilayer magnetic seedlayer on the base. A magnetic layer on the seedlayer has a trapezoidal cross-section, a bottom width $W_b$ less than or equal to about 100 nm, a top width of about 1.25 to 3 times $W_b$, a height h, and an aspect ratio $h/W_b$ of about 1:1 to about 10:1.

DETAILED DESCRIPTION

Figure 1A:
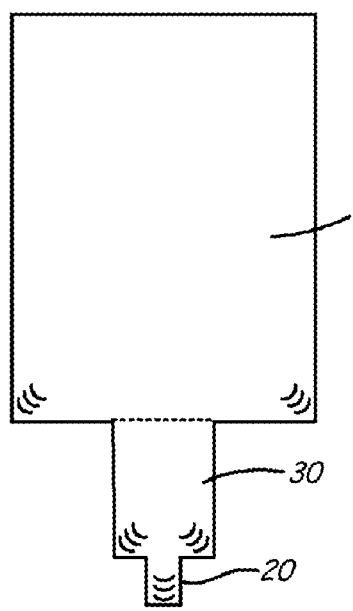
FIG. 1A is a cross-sectional view from the air bearing surface (ABS) plane showing a prior art HAMR write pole.
Figure 1B:
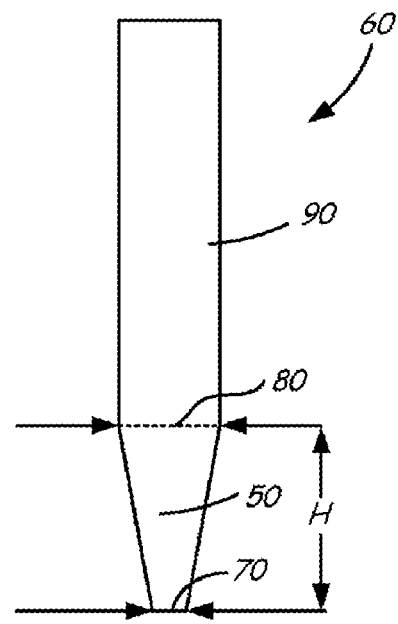
FIG. 1B is a cross-sectional view from the ABS plane showing a trapezoidal write pole of the current invention.

The present invention relates to the problem of side writing or erasure on adjacent tracks due to magnetic field concentrations at sharp corners in prior art write poles with rectangular cross-sections as seen from the air bearing surface (ABS) of a recording media. FIG. 1A shows a cross-section of prior art write pole 10 as seen from the ABS. Write pole 10 has three sections, 20, 30, and 40. The shading on FIG. 1 illustrates magnetic field concentrations capable of side writing or erasure. The embodiment of the invention is to replace sections 20 and 30 with a single pole 50 having a trapezoidal cross-section with a bottom spacing 70 at its tip and a top spacing 80 to form write pole 60 as shown in FIG. 1B. Furthermore, by making the spacing of section 90 in FIG. 1B equal to top spacing 80, the corners responsible for magnetic field leakage are eliminated. In another embodiment of the invention, the aspect ratio H/W of the trapezoidal pole 50 is about 1:1 to about 10:1 to keep the wider portions away from the bottom edge (front edge) of the pole that does the writing. In another embodiment of the invention, the magnetization of the trapezoidal pole 50 is graded to ensure that the field from the top of the pole is lower than the field from the bottom of the pole since writing is done at the bottom of the pole.

Prior art trapezoidal poles have been fabricated using high angle ion-beam etching with masking to create the trapezoidal shape. This process is not compatible with the process used to form heat assisted magnetic recording (HAMR) heads. A process that is compatible with the HAMR process is electroplating in a resist trench with a trapezoidal shape.

The disclosed invention solves the following issues. 1) The trench has a trapezoidal shape. 2) The trench width at the bottom is less than 100 nm. 3) The aspect ratio $h/W_b$ is about 1:1 to about 10:1. 4) Removing the seedlayer without leaving a footing or redepositing seedlayer material on the sides of the pole. 5) Backfilling with alumina without leaving voids in the alumina. 6) The process needs to be compatible with standard processes in industry fabs.

The invention discloses how to form a narrow trench with a controlled trapezoidal shape and controllable top and bottom separations. In summary the method is a hybrid thermal flow process consisting of a resist post-development thermal bake treatment process that allows a sub-100 nm high aspect ratio trench with a trapezoidal shape to be formed that can then be used as a template for electroplating writer pole materials.

Lithographic Process

Figure 2:
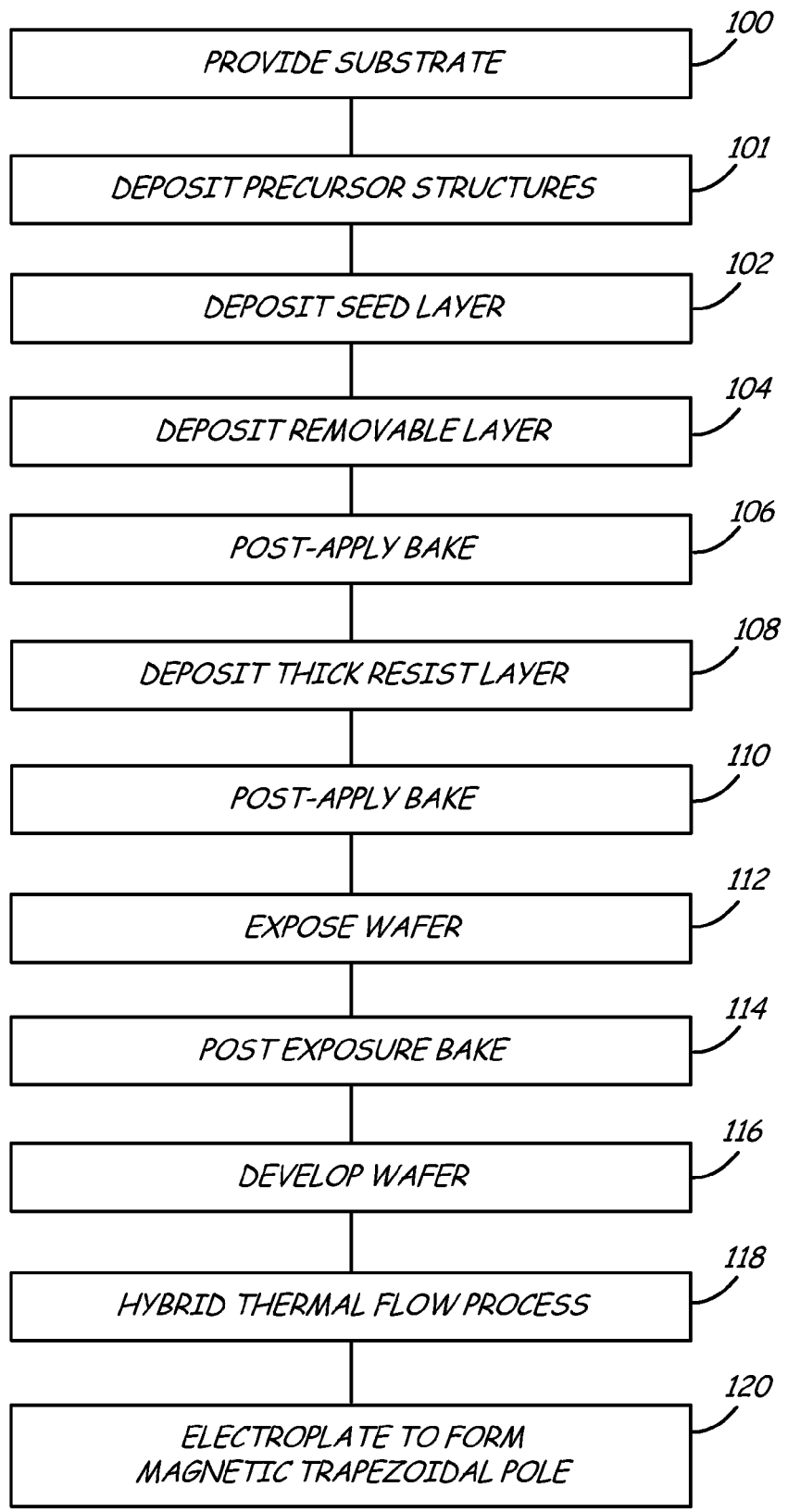
FIG. 2 is a diagram illustrating the steps to form a trapezoidal pole.

The steps to form a magnetic pole with a trapezoidal cross-section are given in FIG. 2. First, a substrate is provided (step 100). The substrate can be a ceramic composite used to form sliders such as an aluminum oxide/titanium oxide composite or other materials known in the art. A plating seedlayer is deposited on the substrate (step 102). Suitable seedlayers are selected from a group but are not limited to FeCo, NiFe, CoNiFe, Ru, Ta, CoZrTa, CoNbTa, and Cu.

A thin, easily removable, resist layer is deposited on the seedlayer (step 104). The removable layer is preferably about 10 nm to about 30 nm thick and is preferably a polymethylglutarimide (PMGI) layer. The removable layer is then given a post-apply bake (step 106). A thicker top resist layer is then deposited on the PMGI layer with a thickness of from about 0.5 μm to about 4.0 μm depending on the requirements for the top pole design (step 108). The resist is then given a post-apply bake (step 110). The resist is then exposed using e-beam or other lithographic tools e.g. G-line, I-line, DUV, 193 nm scanner, electron beam direct write, EUV, x-ray lithography or others (step 112). The exposed wafer is then given a post exposure bake (step 114). The exposed wafer is then developed in standard tetramethyl ammonium hydroxide (TMAH) developer to form a rectangular trench (step 116). The developed wafer is then put through a hybrid thermal flow process, described later, to produce the proper trapezoidal shape and spacing of the trench (step 118). Magnetic material is then electroplated in the trench to form a magnetic trapezoidal pole (step 120).

Hybrid Thermal Flow Process

Figure 3:
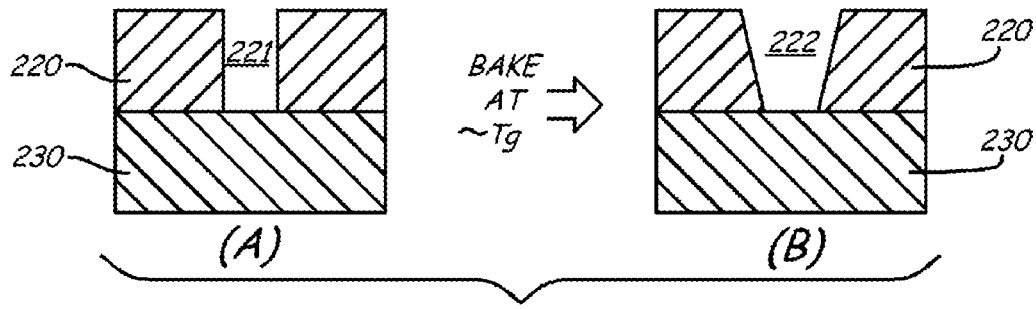
FIG. 3 is a cross-sectional view of a trench in a resist layer on a substrate before (A) and after (B) a thermal bake process.

The hybrid thermal flow process is composed of two processes, a thermal bake process and a thermal shrink process. In the thermal bake process, the resist is baked at a temperature close to the glass transition temperature, Tg, of the resist. This causes the walls of the trench to slope into a trapezoidal cross-section as shown in FIG. 3. FIG. 3A shows resist layer 220 with trench 221 on substrate 230 before thermal bake process. FIG. 3B shows resist layer 220 after thermal bake. Trench 221 with rectangular cross-section has transformed into trench 222 with trapezoidal cross-section after the bake.

Figure 4:
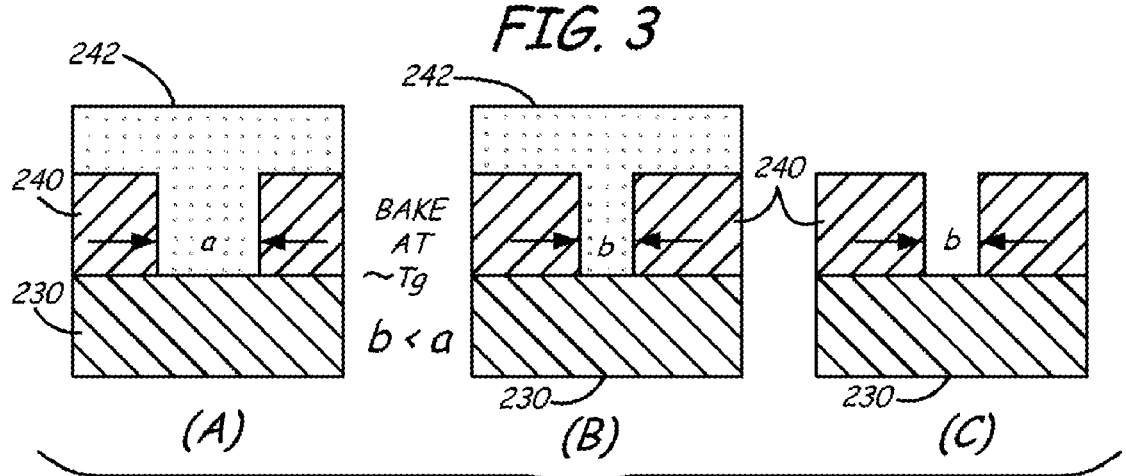
FIG. 4 is a cross-sectional view of a capped trench in a resist layer on a substrate before (A) and after (B) a thermal shrink process. The resist cap is removed in (C).

The thermal shrink process is illustrated in FIG. 4 where resist layer 240 on substrate 230 with a rectangular trench is capped with resist layer 242. Resist layer 242 is applied by spin coating and fills the trench during the process. The spacing of the trench is "a". The resist is then baked at a temperature less than, equal to, or greater than that used for the thermal bake process. This thermal shrink process causes the separation of the two walls of the trench to decrease giving an added dimension to the control of the trapezoidal trench forming process. The new spacing is "b" where b<a. The thermal shrink process can be repeated at will to obtain the required trench separation. The thermal bake process and thermal shrink process can be interchanged as needed to obtain required trapezoidal trench shapes and dimensions. By combining the two processes, trenches with high aspect ratios of 1:1 to 10:1 and sub-100 nm spacing have been produced. The process is very manufacturable. The addition of the hybrid thermal bake process to an overall manufacturing process can be done using resist development track tools that are standard in most industry fabs. The actual time it takes to incorporate these processes into the lithographic step is minimal compared to the results that can be achieved. In addition, the cost of the added material is attractively small in relation to the cost of updating and maintaining advanced lithographic equipment such as DUV, 193 nm scanners, electron beam direct write, or EUV tools that are needed to reduce trench dimensions to the sub-100 nm regime. It should be mentioned that this method or process is not limited to the application of magnetic pole fabrication. In principle it can be used in any device fabrication in the case where a narrow trapezoidal trench pattern is needed.

Figure 5A:
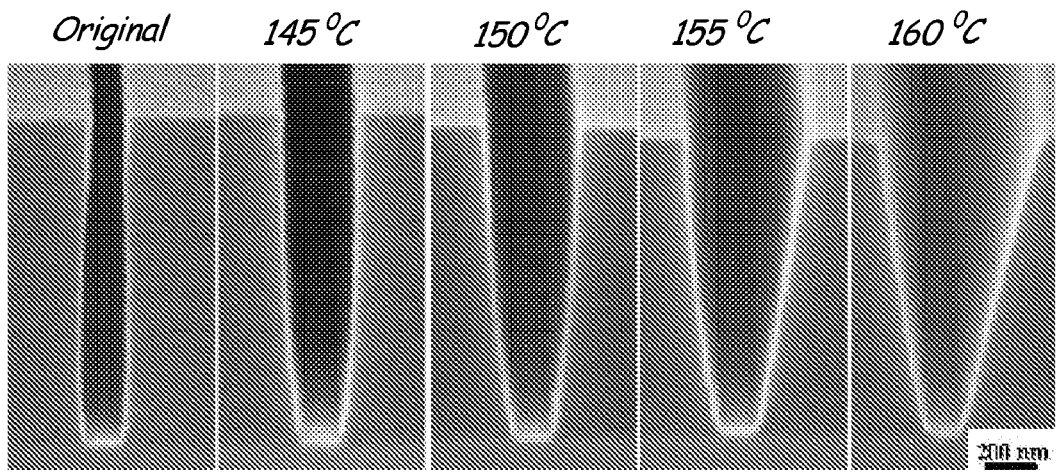
FIG. 5A are SEM images showing different trench profiles achieved at different temperatures during thermal bake process.
Figure 5B:
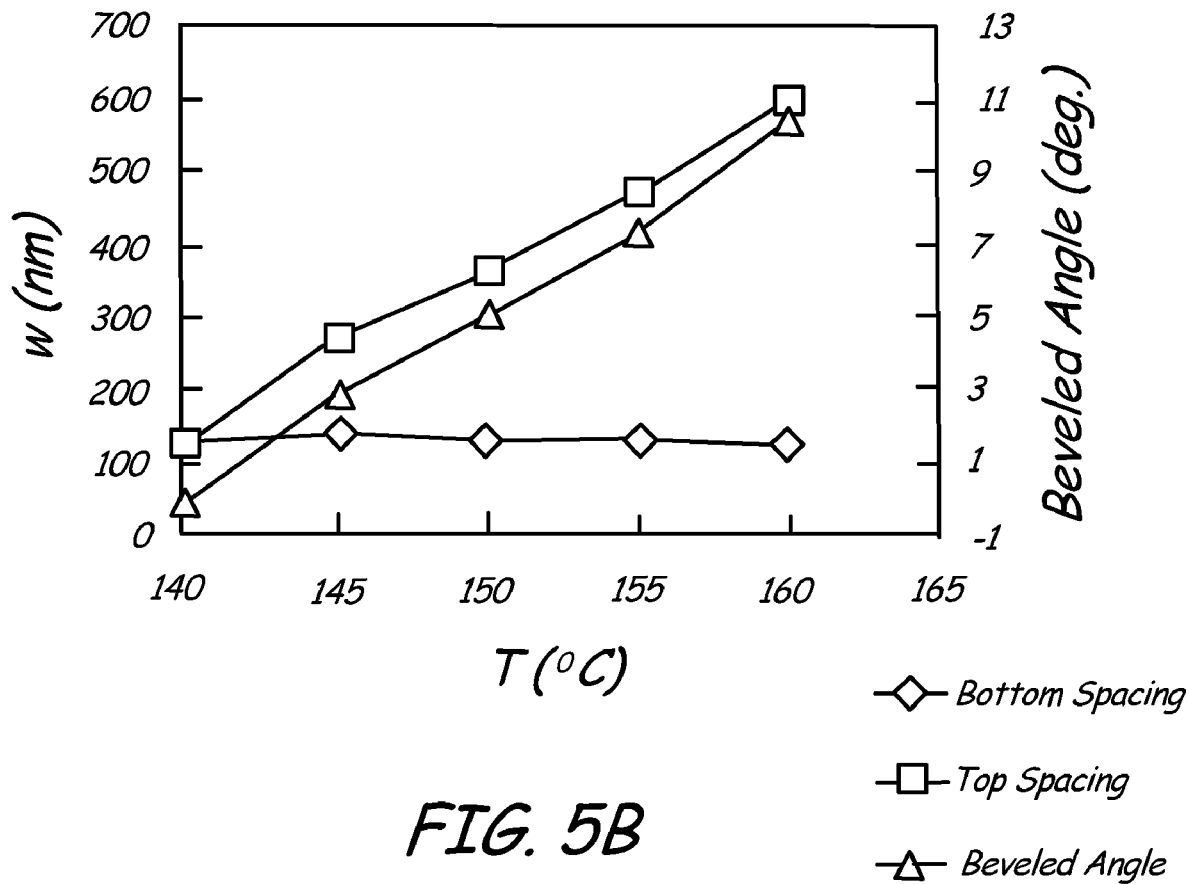
FIG. 5B is a graph showing bottom and top spacing and beveled angle as a function of bake temperature.

An example of how a trapezoidal shape is formed in a 1.3 μm thick resist with a rectangular trench during a thermal bake is shown in FIG. 5A. Scanning electron microscope (SEM) images of the trench are shown at different temperatures after a 60 second bake at different temperatures in FIG. 5A. The bottom and top spacing, of the trench as well as the bevel angle are shown in FIG. 5B as a function of temperature for a 60 second baking time. The top spacing and bevel angle are smoothly varying functions of temperature while the bottom spacing remained constant.

Figure 6A:
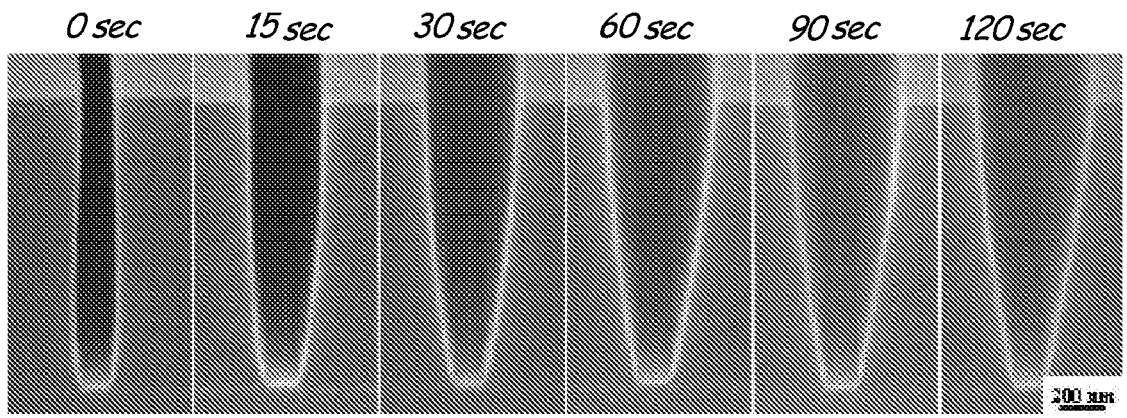
FIG. 6A are SEM images showing different trench profiles after baking for different times.
Figure 6B:
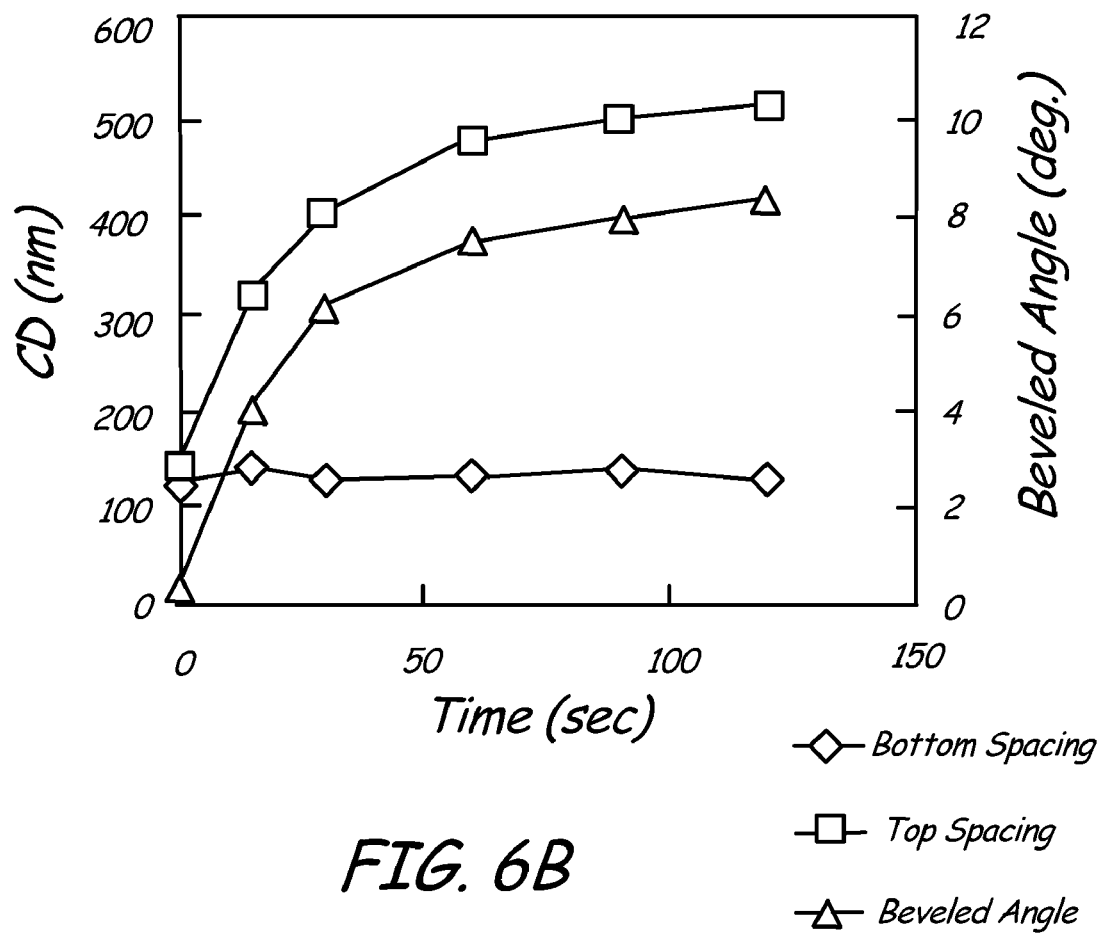
FIG. 6B is a graph showing bottom and top spacing and beveled angle as a function of bake time.

FIGS. 6A and 6B show the time dependence of the thermal bake process at 145° C. on trench dimensions in a 1.3 μm thick resist. The top spacing and bevel angle are smoothly varying functions of time while the bottom spacing remained constant. Combinations of the thermal bake process and the thermal shrink process can give considerable latitude to the shaping of a trapezoidal trench.

Figure 7:
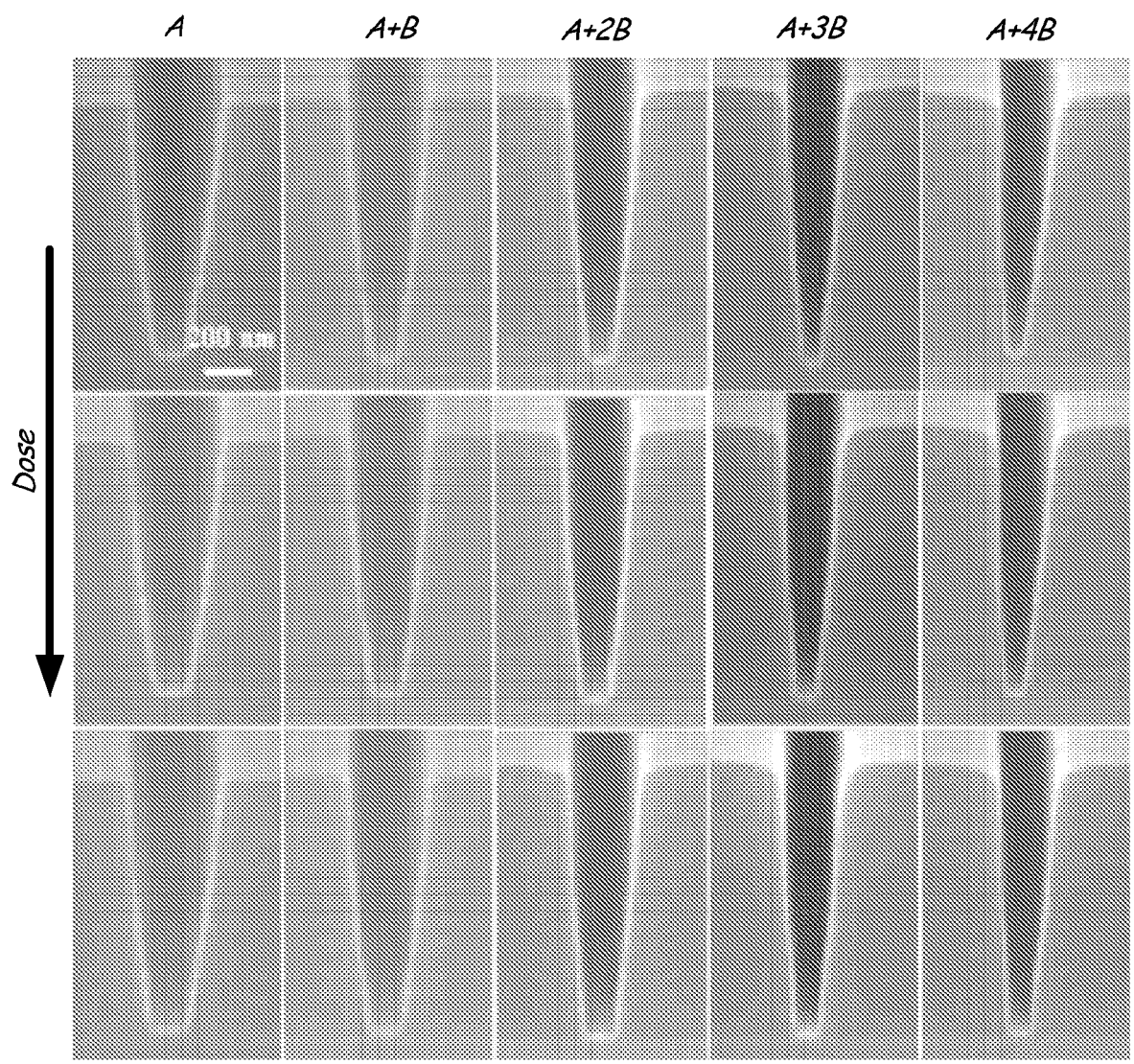
FIG. 7 are SEM images showing trench profiles after combinations of thermal bake (Process A) and thermal shrink (Process B).

FIG. 7 shows SEM images of trenches in a 1.3 μm thick resist given three exposures (increasing from top to bottom). Process A was a thermal bake at 155° C. for 60 seconds and process B was a thermal shrink process at 120° C. for 90 seconds. The shrinking of the wall separation after multiple thermal shrink treatments (A+B, A+2B, A+3B, and A+4B) is evident. Other combinations of treatments were carried out with similar results.

Figure 8:
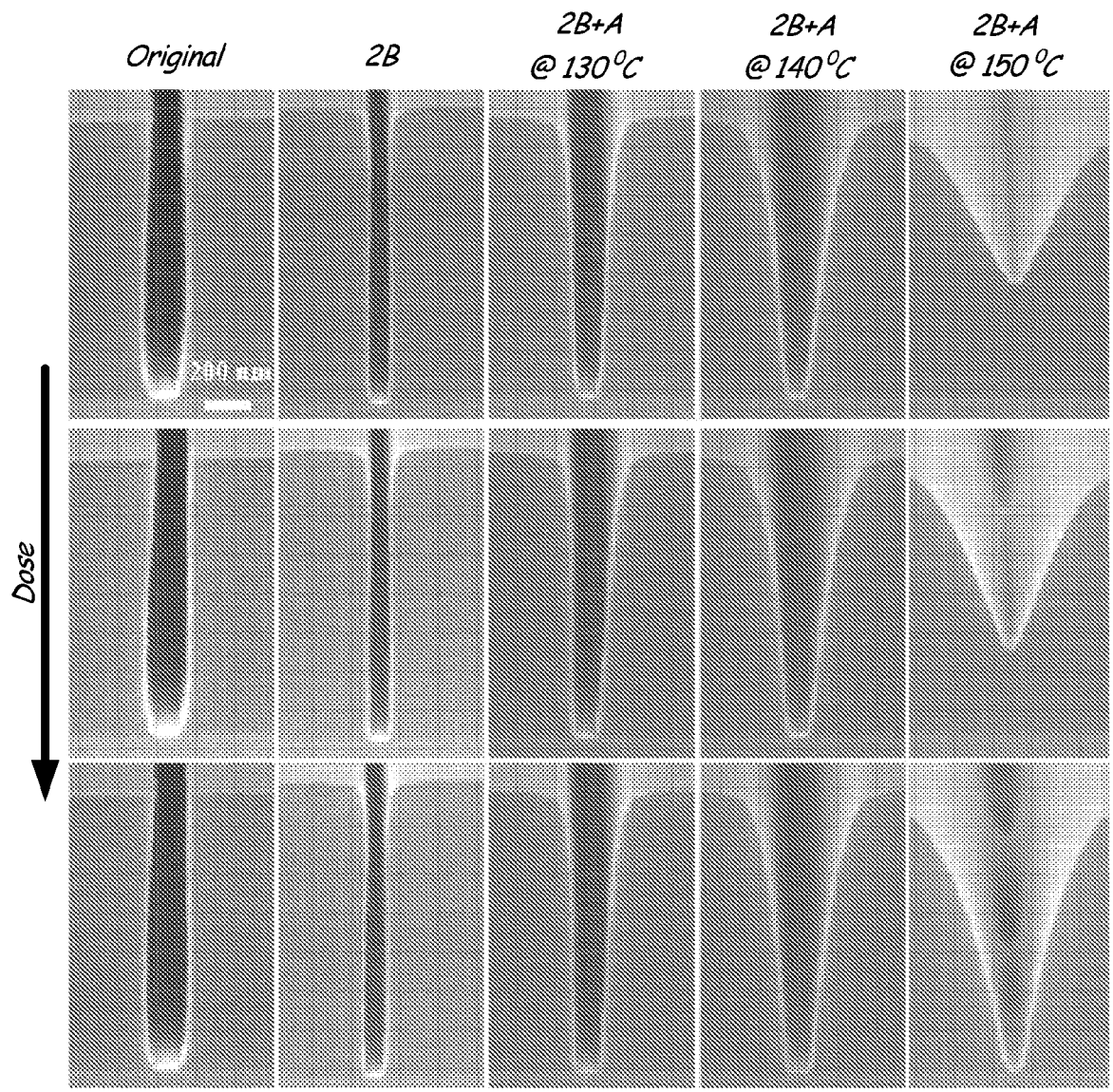
FIG. 8 are SEM images showing trench profiles after combinations of thermal bake (Process B) and thermal shrink (Process A).

FIG. 8 shows trapezoidal shape formation in a 1.3.mu·m thick resist given three exposure levels again. In this case the originals were given two thermal shrink treatments (Process B) of 60 seconds each at 120.degree. C. and then given one thermal bake treatment (Process A) for 90 seconds at 130.degree. C., 140.degree. C., and 150.degree. C. The large control over the shape of the trench is apparent from FIG. 8.

Plating Process

Figure 9:
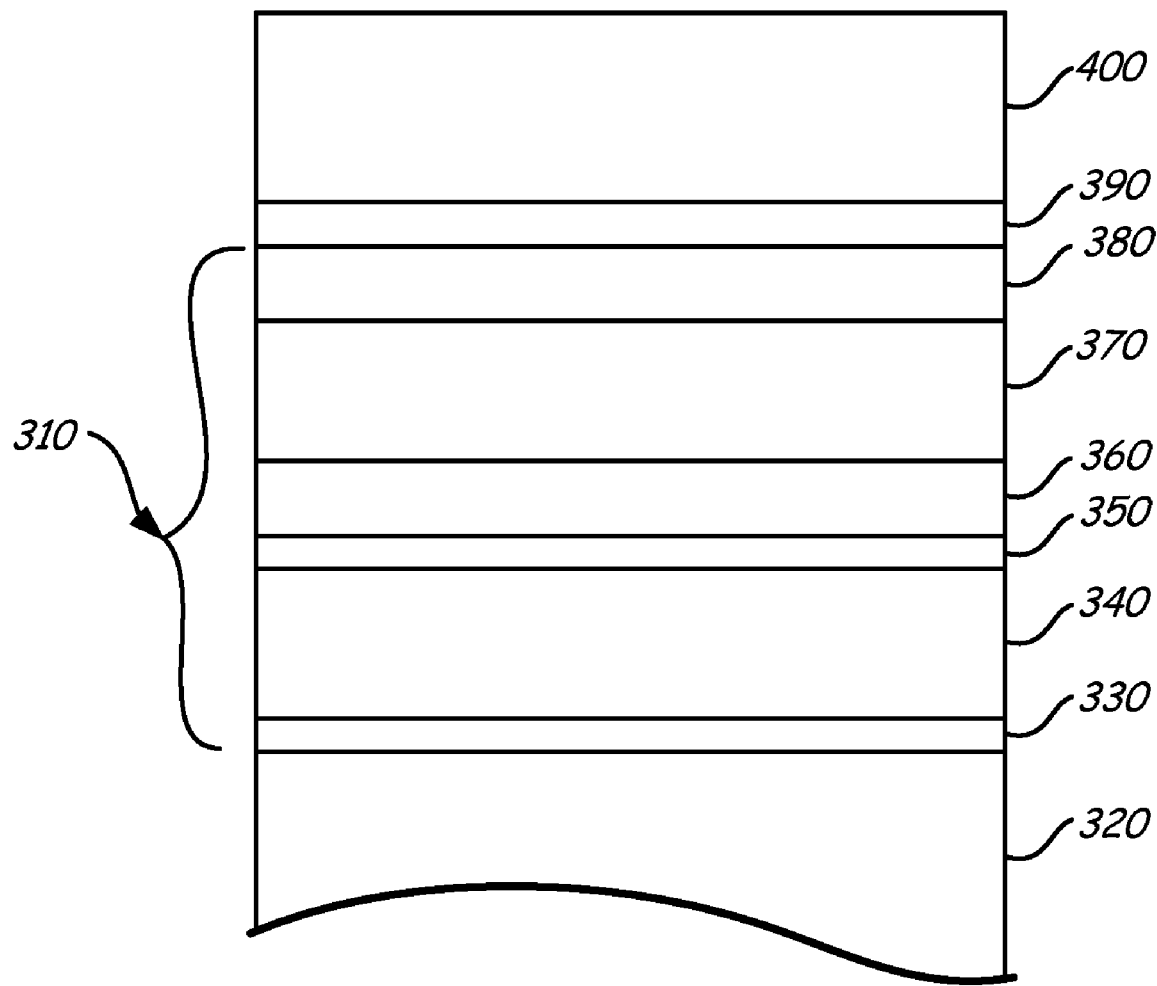
FIG. 9 is a cross-sectional view of resist layer 300 on easily removable resist layer 290 on magnetic seed layer 210 on substrate 220 (not to scale).

The plating process to form a trapezoidal pole starts with step 102 in FIG. 2, deposit seedlayer. Although the seedlayer used in this process is described in detail, other seedlayers and combinations of seedlayers can be used. A schematic showing the layer structure of the seed and resist layers is shown in FIG. 9 where the relative dimensions are not to scale. All layers in seedlayer 310 can be formed by physical vapor deposition (PVD), e-beam vapor deposition, sputtering and other means known to those in the art. The seedlayer has two characteristics, a laminated layer structure and an anticorrosion cap. Seedlayer 310 is shown on substrate 320 and includes first or bottom layer 330 on substrate 320. First layer 330 is NiFe about 15 Å thick. Second layer 340 is CoNiFe about 350 Å thick. Third layer 350 on CoNiFe layer 340 is Ta about 12 Å in thickness. Fourth layer 360 includes three NiFe layers about 15 Å thick each. Fifth layer 370 on NiFe layer 360 is CoNiFe about 250 Å thick. Sixth or cap layer 380 is $Ni_{80}Fe_{20}$ about 50 Å thick and is added for anticorrosion protection as will be discussed below. Easily removable resist layer 390 is on cap layer 380. Layer 390 is preferably a PMGI layer about 10 nm to 30 nm thick and is applied to protect the seedlayer at the base of the trench during subsequent thermal processing. Thick resist layer 400 is on thin easily removable layer 390. Resist layer 400 is from 0.5 μm to 4.0 μm thick depending on the requirements of the pole design.

Figure 10A:
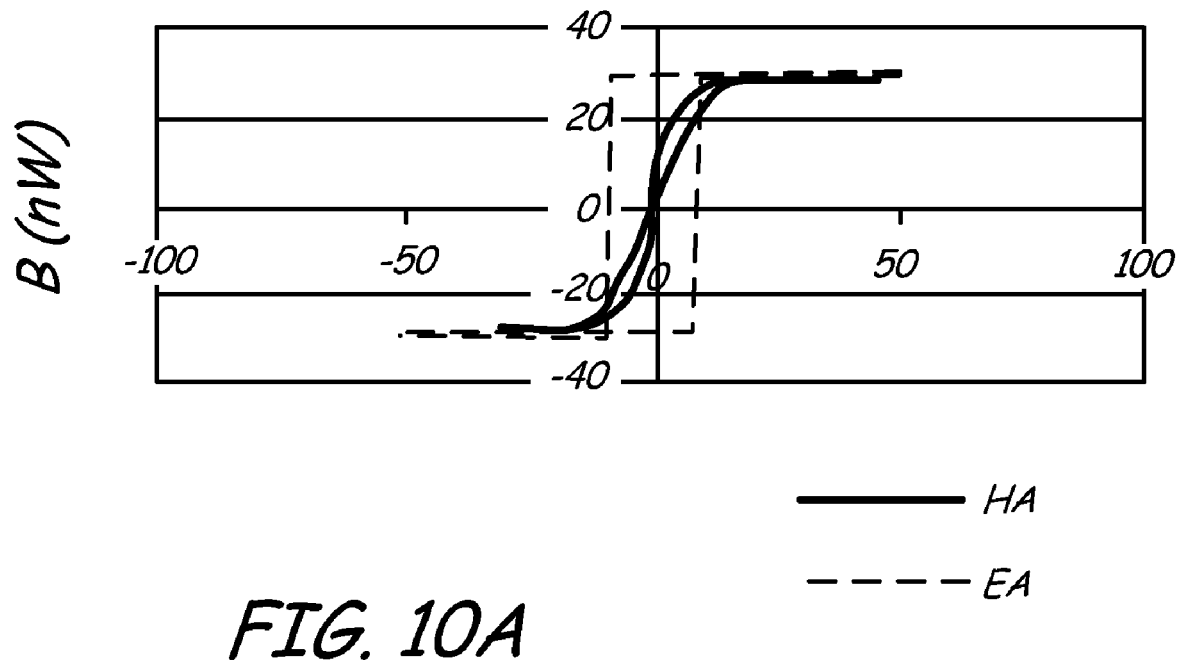
FIG. 10A are magnetic hysteresis loops for a 1000 Å single CoNiFe layer.
Figure 10B:
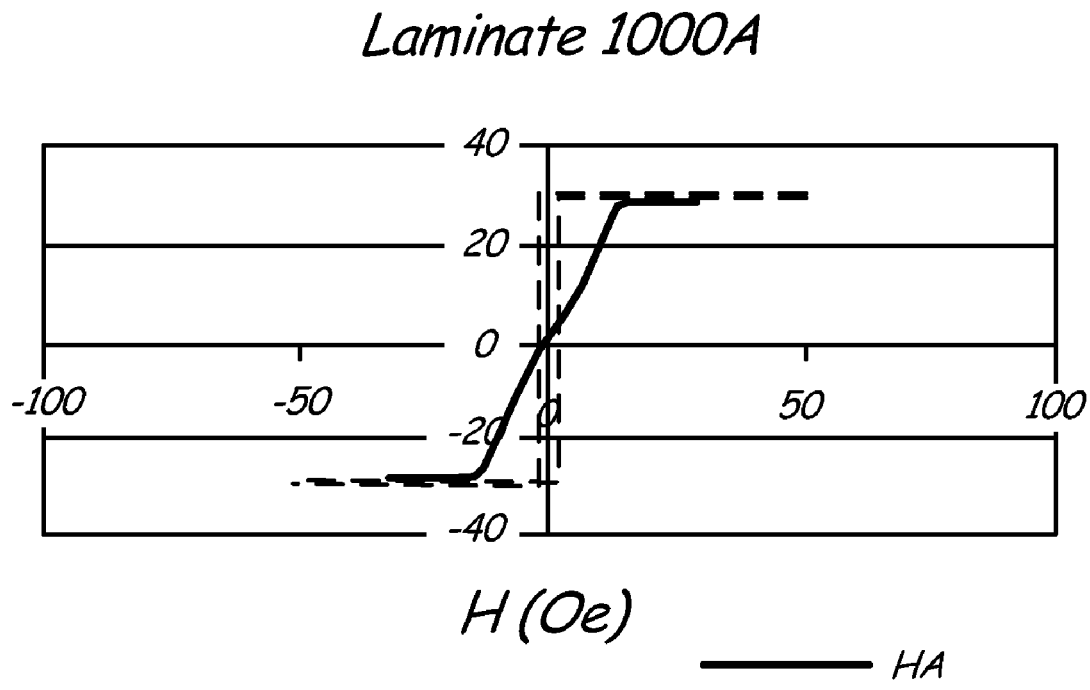
FIG. 10B are magnetic hysteresis loops for a 1000 Å laminated seedlayer with a $Ni_{80}Fe_{20}$ cap layer.

Magnetic properties of laminate seedlayer 310 are compared with a single CoNiFe layer in FIGS. 10A and 10B. FIG. 10A shows B versus H hysteresis loops for a solid 1000 Å CoNiFe film and FIG. 10B shows B versus H hysteresis loops for a 1000 Å laminate film. The hard axis loop of the laminate shows almost no hysteresis.

In another embodiment of this invention, the magnetization of each magnetic layer in the seedlayer can be different such that the seedlayer exhibits a vertical magnetization gradient which can contribute to the magnetization gradient in the write pole.

Figure 11:
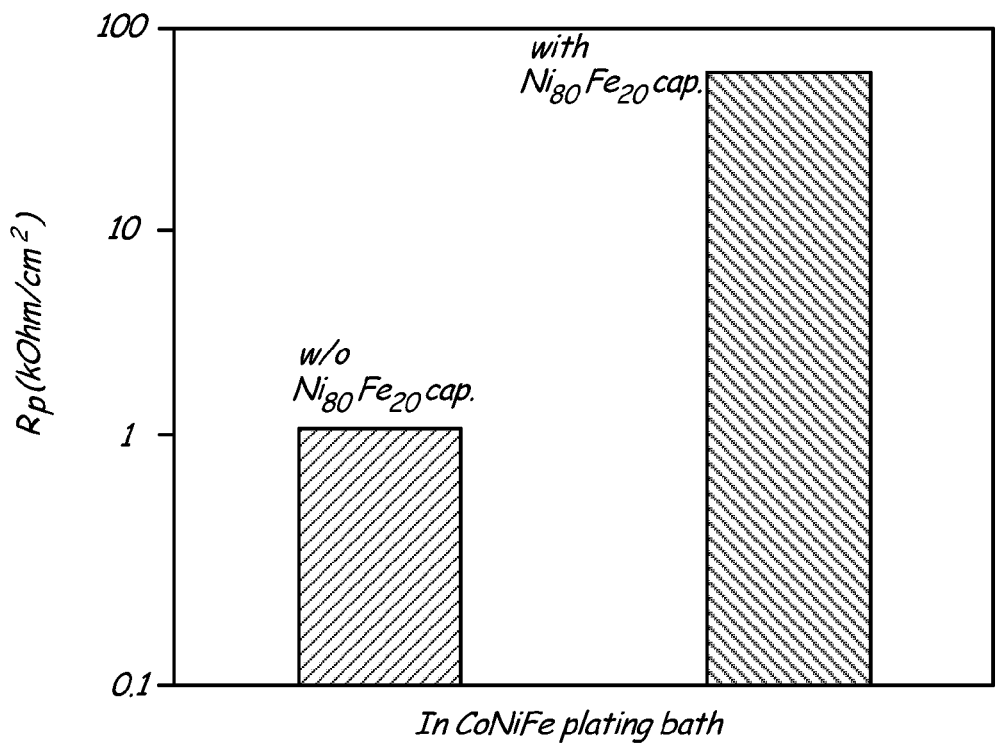
FIG. 11 is a chart of corrosion resistance of CoNiFe seedlayers with and without $Ni_{80}Fe_{20}$ cap layer.
Figure 12:
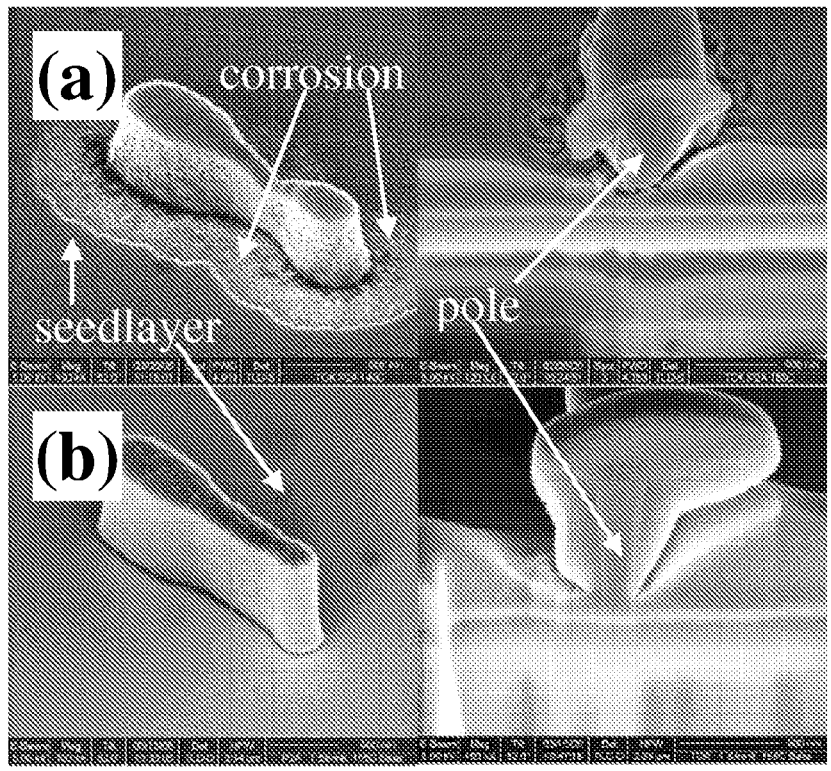
FIG. 12 are SEM images of 100 nm wide plated trapezoidal poles using (a) a CoNiFe seedlayer and (b) a CoNiFe seedlayer with $Ni_{80}Fe_{20}$ anti corrosion cap layer.

FIG. 11 shows the corrosion resistance of a capped seedlayer to be superior to that of an uncapped layer. This corrosion protection is important in defining the shape of the pole. The formation of the trapezoidal resist shape as shown earlier involves thermal baking and shrinking which results in undercut features at the resist/seedlayer interface. During the pre-plate and plating processes, the corrosive plating solution can be trapped in this crevice and cause corrosion. This is evident in FIG. 12 which shows SEM images of 100 nm wide plated trapezoidal poles using a CoNiFe seedlayer without (a) and with (b) $Ni_{80}Fe_{20}$ anticorrosion cap 280. The SEM images on the right were taken after the poles were sectioned to show the trapezoidal shape. With the $Ni_{80}Fe_{20}$ cap layer 280, the corrosive solution trapped in the photoresist could not visibly corrode the seedlayer. Since the plating process is on top of an intact (uncorroded) seedlayer, the pole morphology is visibly improved and the depression in the center of the pole is eliminated.

Trapezoidal Pole Plating

Figure 13:
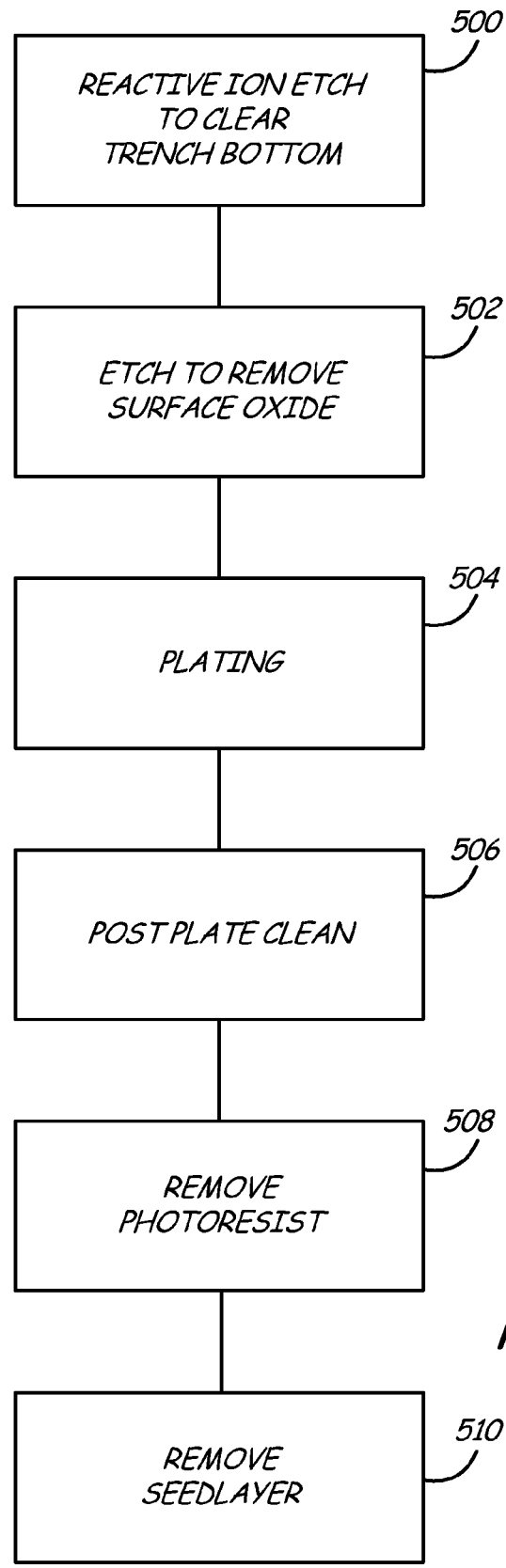
FIG. 13 is a diagram illustrating the steps to electroplate magnetic trapezoidal pole.

The plating process flow to form a trapezoidal pole is shown in FIG. 13 which shows the steps to electroplate a magnetic trapezoidal pole. At step 500, removable layer 390 at the bottom of the trench is removed to expose the seedlayer. This is carried out by $O_2$ reactive ion etching to clear trench bottom. Next, etching removes surface oxide on the seedlayer (step 502). An acid spray etch performs this process. At step 504, the trench is filled with magnetic material by electroplating. Solid FeCoNi, FeCo and graded magnetization poles can be formed. Following electroplating, the plated trench is rinsed and dried to remove plating solution (step 506). In the next step, the photoresist is removed by oxygen ashing and solvent stripping (step 508). As discussed later, in the final step, the exposed seedlayer is removed by ion beam etching (step 510).

The solid CoNiFe pole is electroplated using the parameters shown in Table 1.

TABLE 1

Solid CoNiFe trapezoidal pole plating chemistry and parameters.

| Chemical | Concentration (g/l) and parameters |
|---|---|
| $NiCl_2 \cdot 6H_2O$ | 40 |
| $CoCl_2 \cdot 6H_2O$ | 31 |
| $FeCl_2 \cdot 4H_2O$ | 4 |
| $H_3BO_3$ | 40 |
| $NH_4Cl$ | 40 |
| STJ additive | 0.65 |
| Sodium LaurlelSulfate (SLS) | 0.1 |

TABLE 1-continued

Solid CoNiFe trapezoidal pole plating chemistry and parameters.

| Chemical | Concentration (g/l) and parameters |
|---|---|
| PH | 2.8 |
| Current | 2.8-3 $mA/cm^2$ |

Referring to Table 1, the organic STJ additive acts as a leveling agent and plays an important role in controlling the grain size and surface morphology of the plated pole. Its adsorption to the narrow trench surface can be preferentially enhanced due to radial transportation at the current crowding points thereby increasing plating uniformity. Due to the trapezoidal profile of the trench cross-section, the accessibility of the small trench by the diffusing metal ions can be increased. This improves the uniformity of the plated pole cross-section along the length of the pole.

Graded Ms Poles

Figure 14:
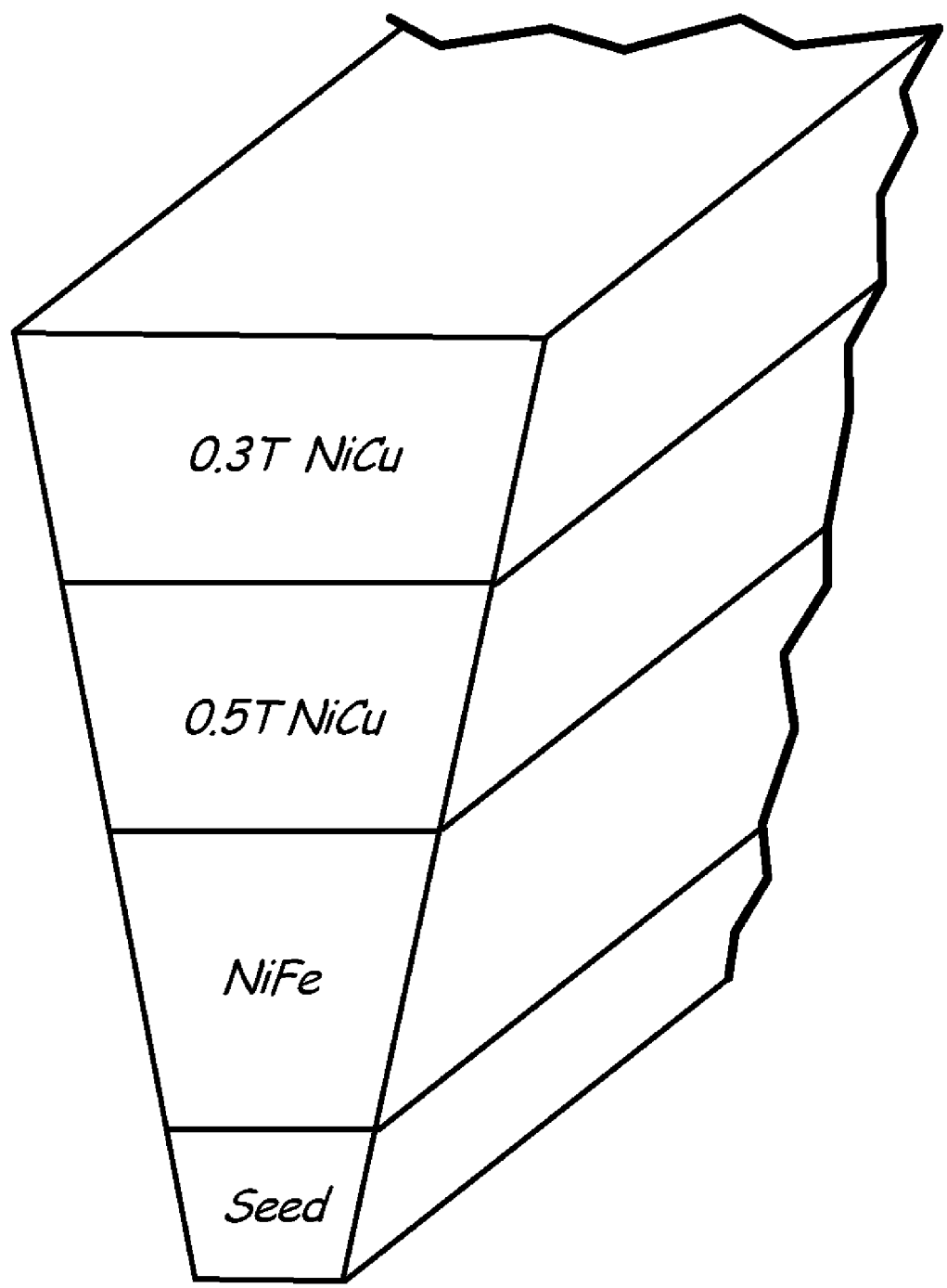
FIG. 14 is a schematic of an Ms gradient trapezoidal pole configuration.

As illustrated in FIG. 1A, prior art poles 10 are solid, plated, high Ms CoFeNi material for sections 20, 30, and 40. This high Ms configuration results in a magnetic field spike at the back of the pole 10. In order to reduce this field spike, trapezoidal poles with an Ms gradient can be employed. A schematic of a trapezoidal graded Ms pole is shown in FIG. 14.

Three different pole materials with different magnetization can be plated to form this pole. For example, in the current seedlayer configuration (sputtered Si on substrate)/NiFe 15 Å/CoNiFe 250 Å/Ta 12 Å/NiFe 15 Å)$_3$/CoNiFe 250 Å/$Ni_{80}Fe_{20}$ 50 Å, it is possible to subsequently plate 100 nm of 1T NiFe layer using a regular NiFe bath, and 50 nm of 0.5T NiCu on the 1T NiFe layer, and 50 nm of 0.3T NiCu layer on the 0.5T NiCu layer using another bath.

The 0.3T and 0.5T NiCu layers can be plated from a single bath using the novel developed bath chemistry shown in Table 2.

TABLE 2

0.3T and 0.5T NiCu plating chemistry and parameters.

| Chemical | Concentration (g/l) and parameters |
|---|---|
| $NiCl_2 \cdot 6H_2O$ | 119 |
| $CuSO_4 \cdot 5H_2O$ | 0.5 |
| Sodium citrate dehydrate | 29.4 |
| $H_3BO_3$ | 25 |
| STJ additives | 0.6 |
| SLS | 0.1 |
| PH | 55 |
| Current (0.3T/0.5T) | 2.5/10 $mA/cm^2$ |

Figure 15:
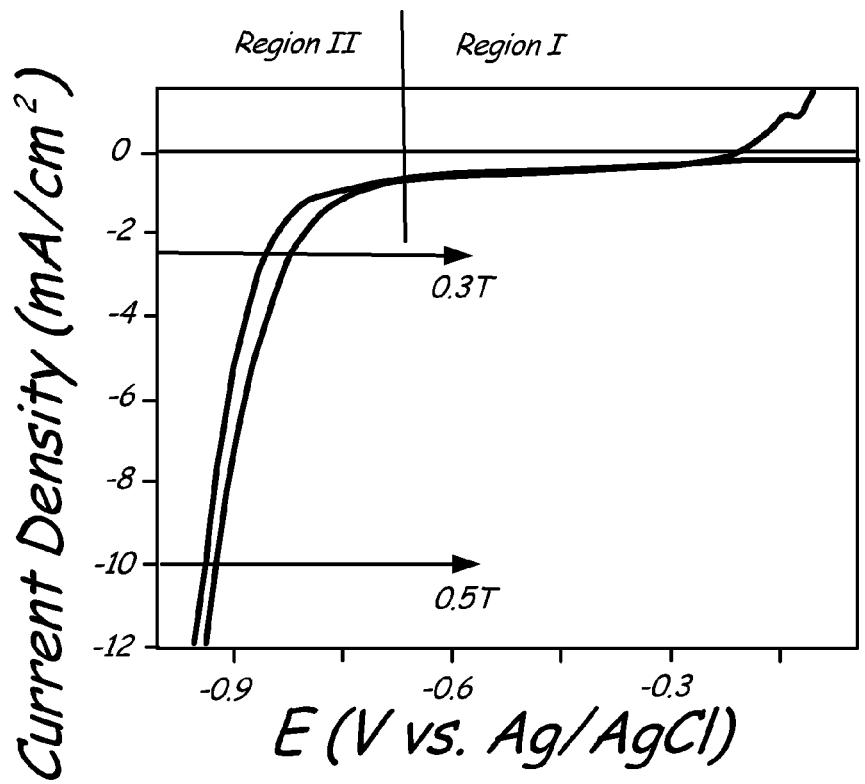
FIG. 15 is a cyclic voltammetry plot of current density versus applied potential for the single bath electrolyte shown in Table 2.

In the single bath method, deposition is carried out using a single electrolyte while varying deposition parameters such as voltage or current to produce compositional, structural and magnetic modulations of the plated structure. For example, current density is shown as a function of applied voltage in cyclic voltammetry measurements made using the bath given in Table 2 where ions of two metals, Cu and Ni, with Cu being more noble than Ni, are present. At certain potentials (or currents) that are sufficiently negative, Cu will be reduced and Ni will not. In this region, region I in FIG. 15, Cu will be plated and Ni will not. As the potential is decreased into region II, both Cu and Ni will plate and the amounts of each will depend on the applied potential. As shown in FIG. 15, a 0.3T NiCu alloy will plate at a current density of about −2.5 mA/cm$^2$ and a 0.5T NiCu alloy will plate at a current density of −10.0 mA/cm$^2$. Since the deposition rate of Cu is diffusion limited and hence constant, by varying the potential (or current) during plating, composition and magnetic modulations of the plated structure can be achieved.

Figure 16:
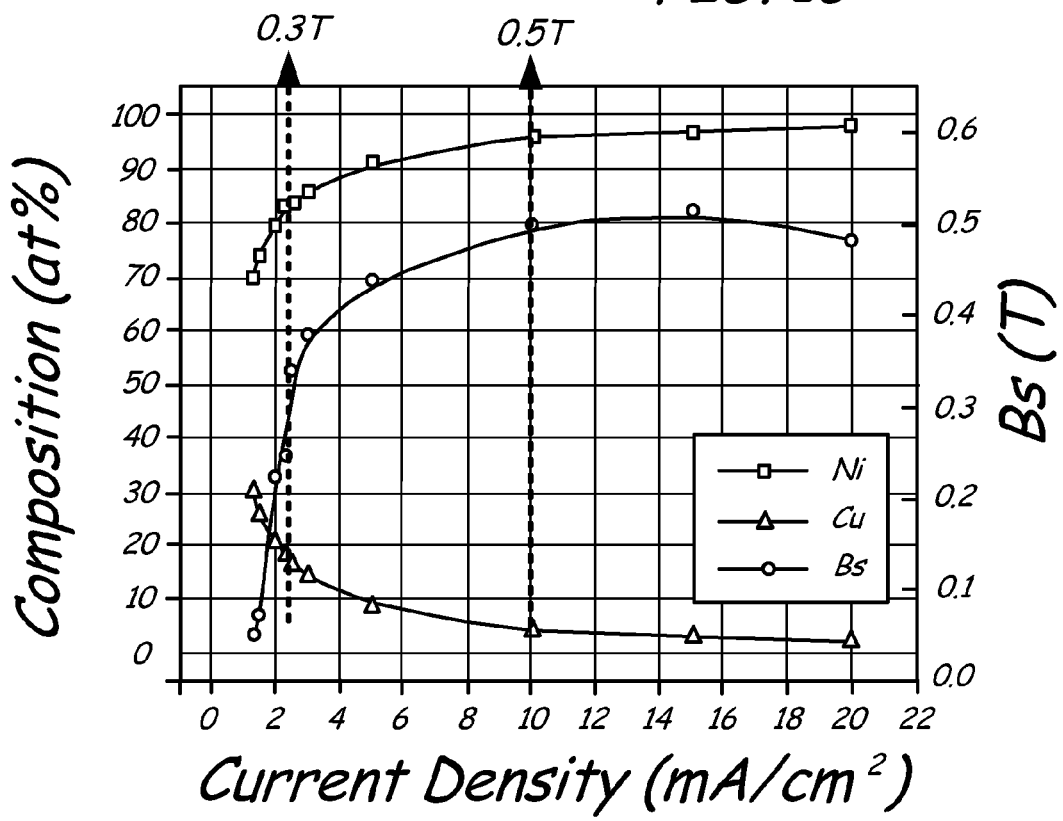
FIG. 16 is a graph showing how composition and magnetic moment of a plated pole can be tailored by adjusting plating current density for the single bath electrolyte shown in Table 2.

The current control technique is employed in the wafer scale embodiment described here. FIG. 16 shows the composition and magnetic moment variation in NiCu plated layers as a function of plating current. As shown in the figure, the magnetic moment, Bs, can be conveniently tailored by adjusting the plating current. Specifically, 2.5 and 10 mA/cm$^2$ currents can be applied to obtain 0.3T and 0.5T NiCu. The composition uniformity (1$\sigma$) for 0.5T and 0.3T NiCu plated layers are 0.1$^{at}/_o$ (0.5T) and 0.7$^{at}/_o$ (0.3T) respectively.

Figure 17:
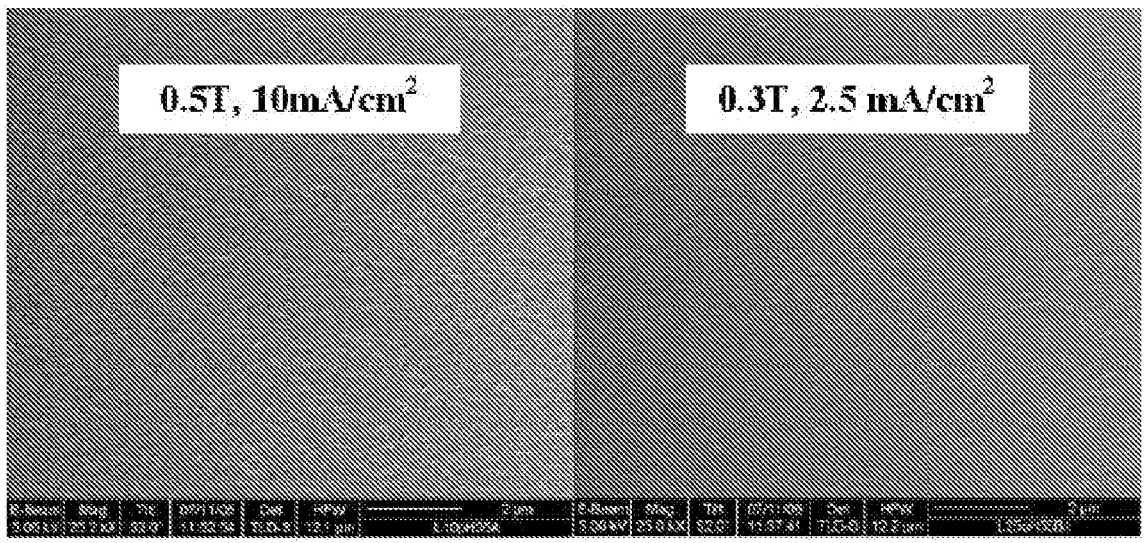
FIG. 17 are SEM images of the microstructures of 0.5T NiCu (left) and 0.3T NiCu (right) plated from the single bath shown in Table 2.
Figure 18:
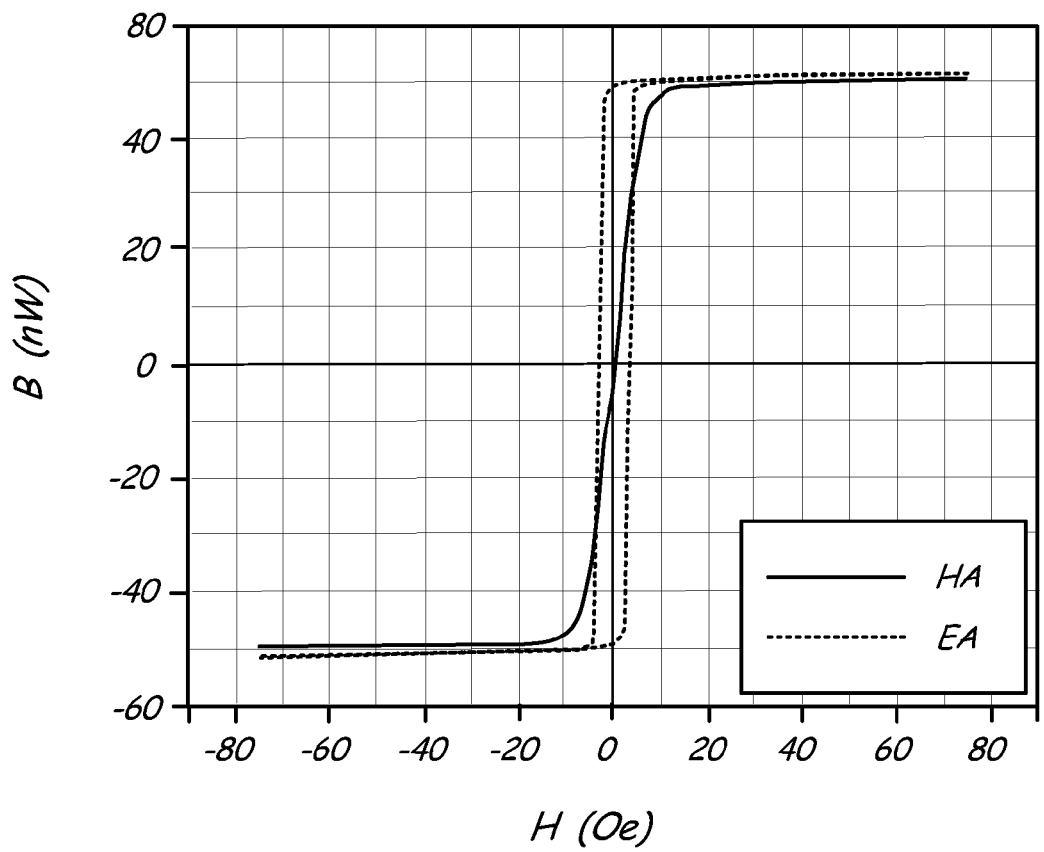
FIG. 18 are magnetic hystresis loops of a plated graded Ms stack containing a CoNiFe laminate seed.

The microstructure of the 0.5T and 0.3T NiCu are shown in FIG. 17 as characterized by scanning electron microscopy (SEM). The surface looks sound and glossy and the grains are refined due to the use of the STJ organic additive in the bath. The magnetic hysteresis loop of an actual rated Ms stack is shown in FIG. 18. The stack consists of 50 nm of 0.3T NiCu on 50 nm of 0.5T NiCu on 100 nm of 1T NiFe on 100 nm of CoNiFe laminate seed.

Seed Removal and Pole Backfilling

Figure 19A:
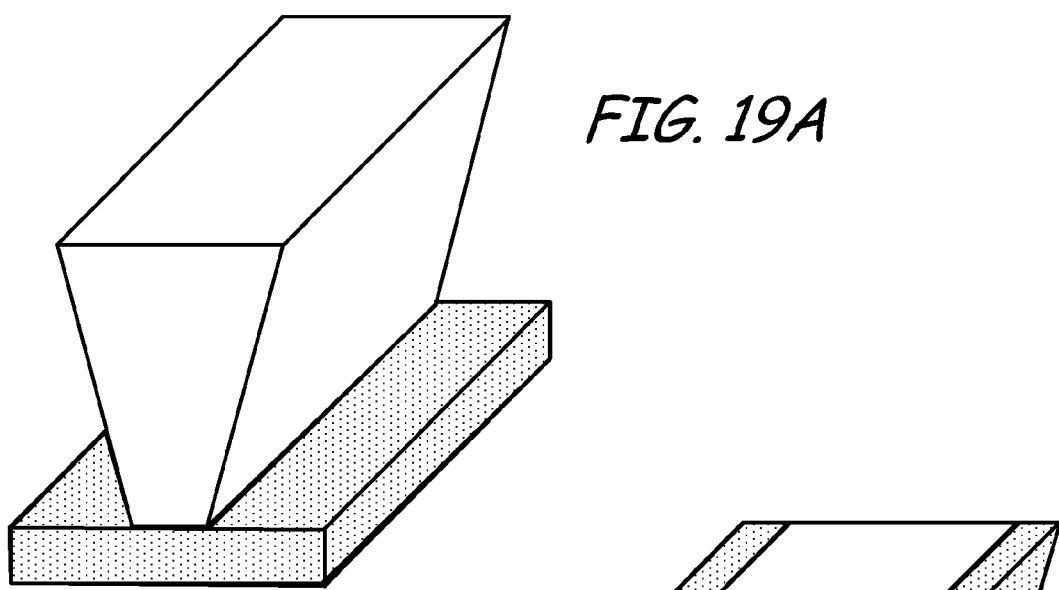
FIG. 19A is a schematic of a trapezoidal pole before seed removal.
Figure 19B:
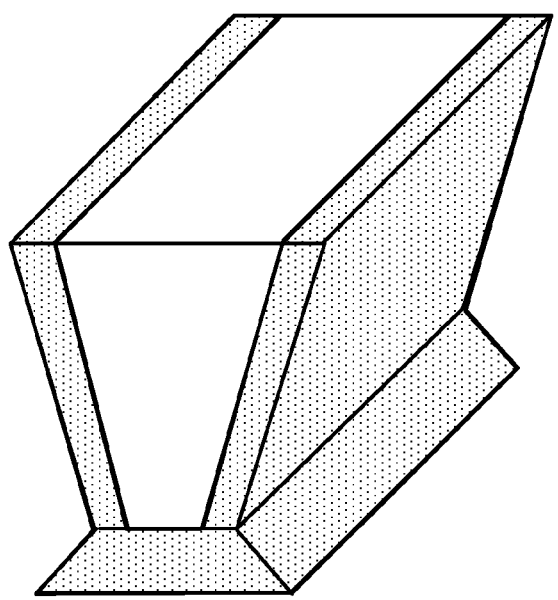
FIG. 19B is a schematic of a trapezoidal pole after seed removal.
Figure 20:
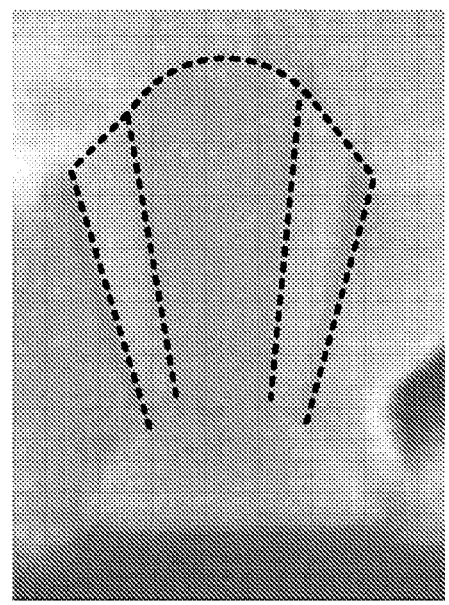
FIG. 20 is a FIB-SEM image of a cross-sectioned trapezoidal pole after seed removal.

FIG. 19A is a schematic of the trapezoidal pole before ion beam etching. FIG. 19B is a schematic of the trapezoidal pole after ion beam etching. FIG. 19B indicates that the seed material redeposits on the sidewalls of the pole when standard rotating ion mill etching procedures are used. FIG. 20 shows a focused ion beam scanning electron micrograph (FIB-SEM) of a cross-sectioned trapezoidal pole after seed removal by the standard rotating beam ion mill etching process. The redeposited layer is indicated by the dashed lines.

Figure 21:
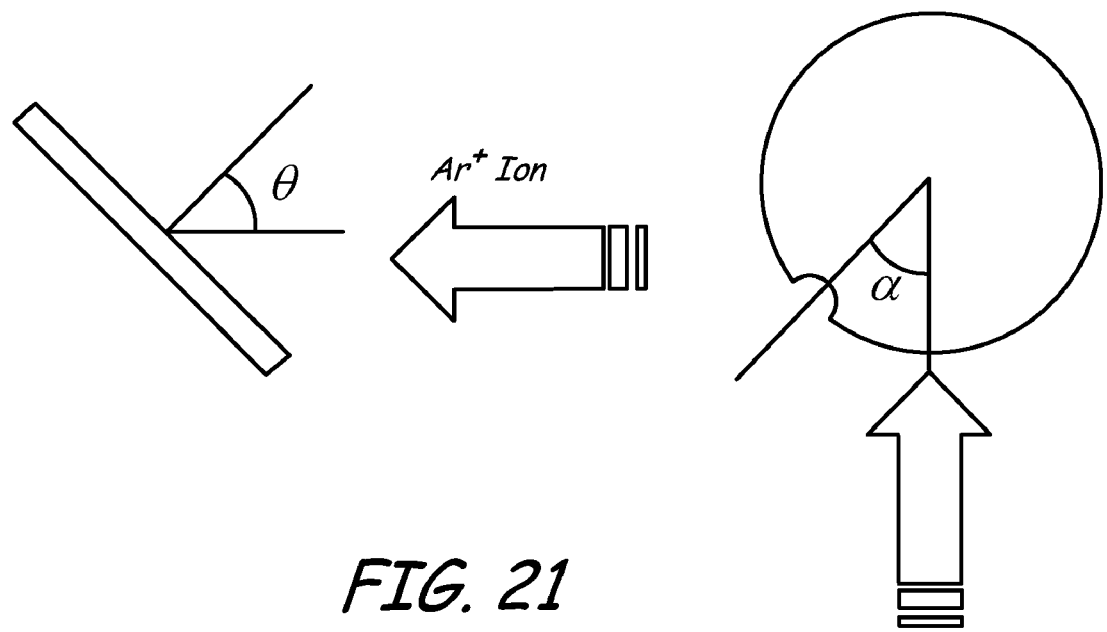
FIG. 21 is a schematic of a static ion beam etch method.

A seed removal method that works best is a static etch with the wafer stationary with the poles at a 30° angle with respect to the ion beam (i.e. $\alpha$=30°) as shown in FIG. 21. In another embodiment, the wafer can be swept through a range of angles e.g. from about 20° to about 40°. As shown in the figure, the wafer is also set at 50° (i.e. $\theta$=50°) to the ion beam.

Figure 22:
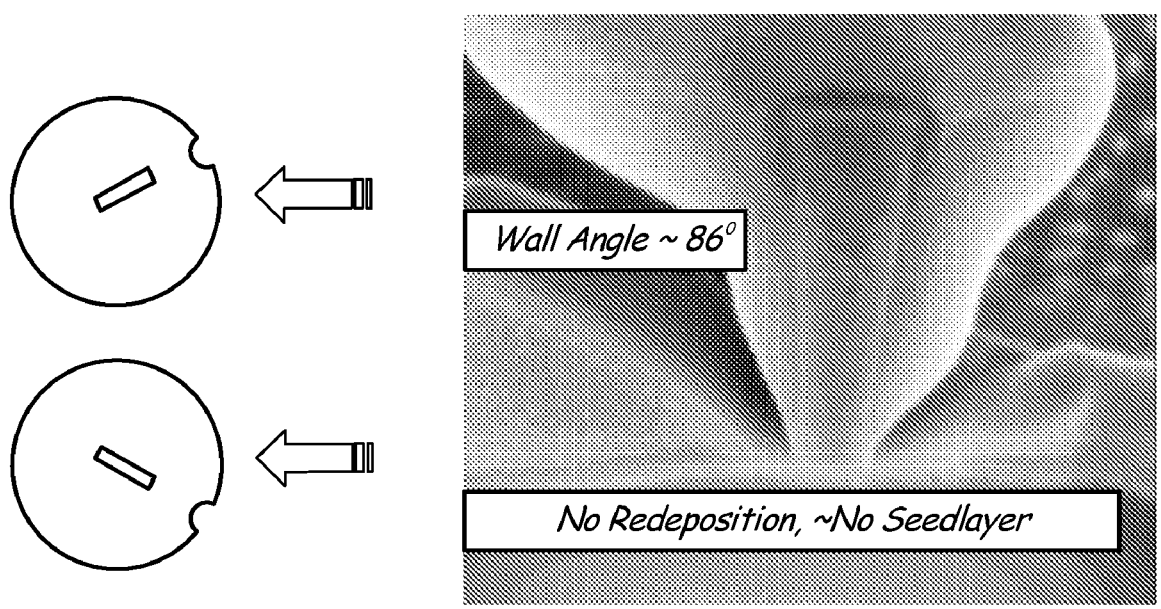
FIG. 22 is a SEM image of a cross-sectioned trapezoidal pole after seed removal by static ion beam etch.

Successful seed removal using this process is shown in FIG. 22. FIG. 22 is an SEM image of a seed with an 86° wall angle with no redeposited seed material on the wall of the seed. The bottom, middle and top widths of the pole are 90 nm, 130 nm and 185 nm respectively.

Figure 23:
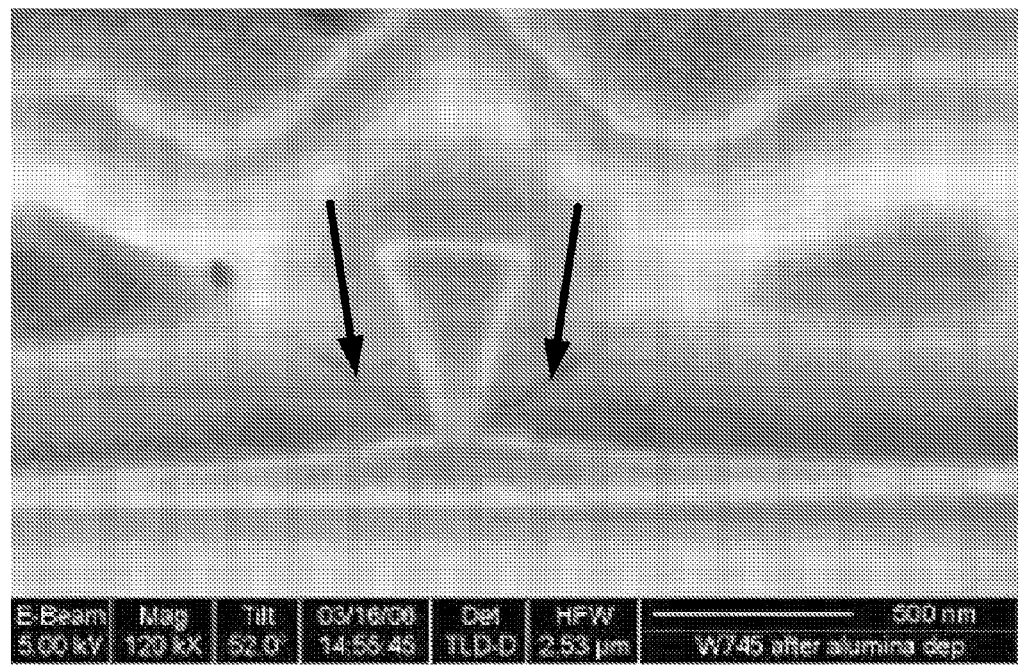
FIG. 23 is a SEM image of a cross-sectioned trapezoidal pole after backfilling with Comptech sputtered alumina.
Figure 24:
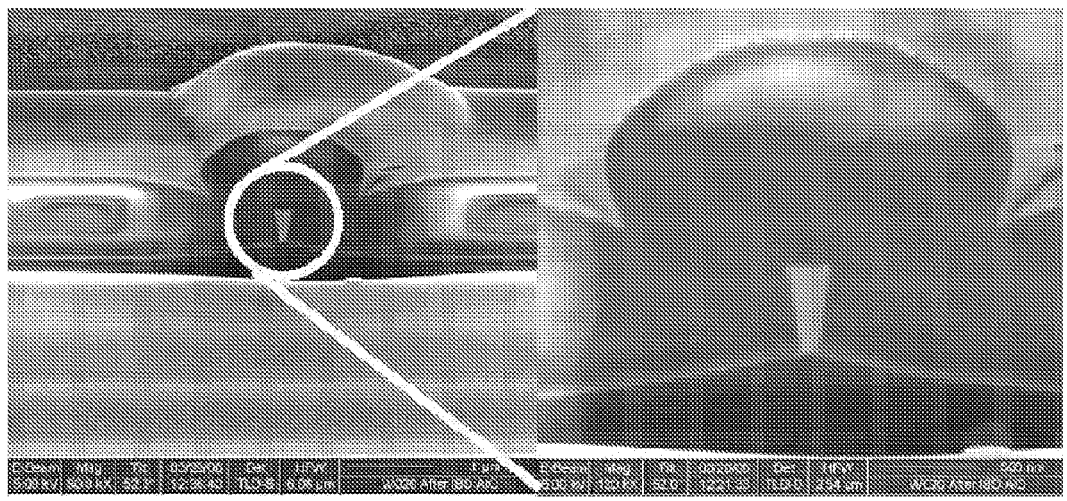
FIG. 24 is a SEM image of a cross-sectioned trapezoidal pole after backfilling with IBD aluminum.

Conventional sputtering such as with Alcatel Comptech equipment cannot be used to backfill the pole with alumina. FIG. 23 is an SEM image of a pole that was backfilled with sputtered alumina using Comptech equipment. There are voids along the sides of the pole as indicated by the arrows. However, ion beam deposition can be used to backfill the pole. FIG. 24 shows two magnifications of SEM images of a pole backfilled with 1.2 μm of ion beam deposited (IBD) alumina deposited at $\theta$=60° with the wafer rotating. There are no voids in the alumina.

EXAMPLE

Figure 25:
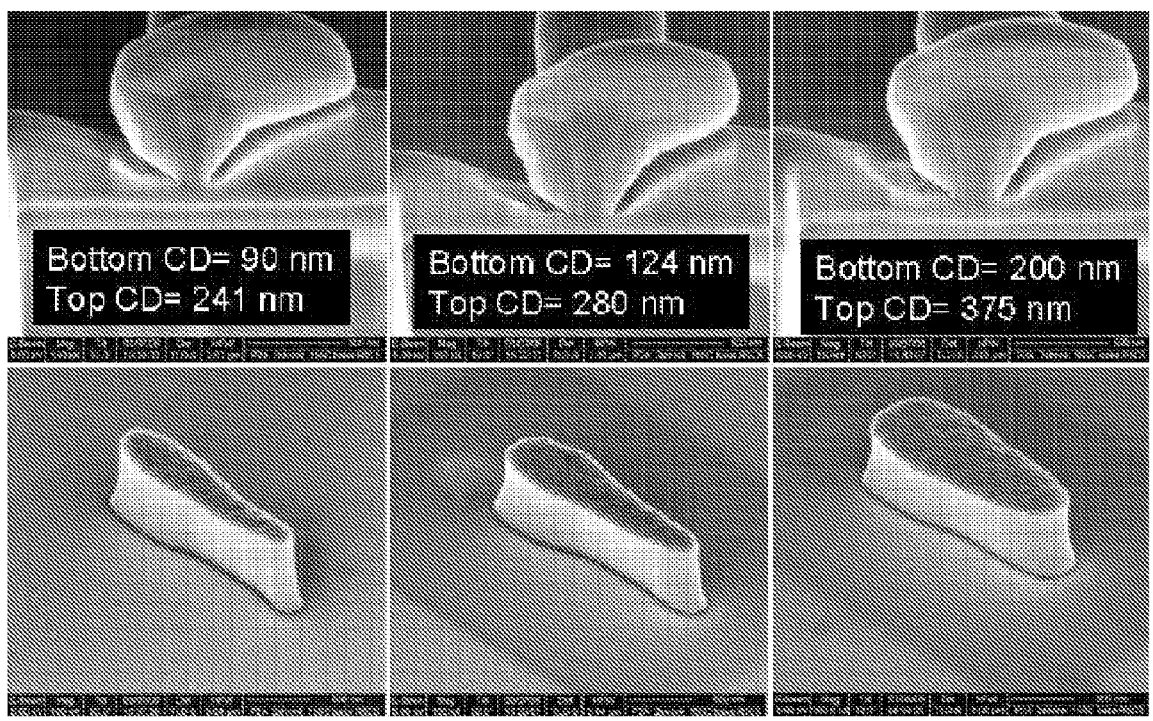
FIG. 25 are SEM images of sectioned (top row) and unsectioned (bottom row) trapezoidal poles with three different designs.

SEM images of three trapezoidal poles with different dimensions that have been fabricated by the invention disclosed herein are shown in FIG. 25. The top images are end-on views of vertical cross-sections of the poles. The bottom images are perspective views of the unsectioned poles. The bottom and top widths (i.e., critical dimension or CD) are indicated on the figure.

In summary, a novel hybrid thermal flow method to form trapezoidal shape resist trench structures has been invented that allows the production of trapezoidal write poles by electroplating. This process has been used to manufacture heat-assisted magnetic recording heads (HAMR).

Although the present invention has been described with reference to preferred embodiments, workers skilled in the art will recognize that changes may be made in form and detail without departing from the spirit and scope of the invention.

The invention claimed is:

1. A magnetic write pole comprising:
   a base;
   a magnetic seedlayer on the base; and
   a magnetic layer on the seedlayer with a front edge trapezoidal cross-section and a top cross-section, the trapezoidal cross-section having a bottom edge with width $W_b$ less than or equal to about 300 nm, having a top edge with width of about 1.25 to about 3 times $W_b$, having a height h, and having an aspect ratio $W_b$, of about 1:1 to about 10:1, the top cross-section being connected to the top edge of the trapezoidal cross-section.

2. The magnetic write pole of claim 1, wherein the magnetic seedlayer is a multilayer seedlayer formed of magnetic and nonmagnetic layers.

3. The magnetic write pole of claim 2, wherein the magnetic seedlayer comprises a first NiFe layer on the base, a second CoNiFe layer on the first NiFe layer, a third Ta layer on the second CoNiFe layer, a fourth NiFe layer on the third Ta layer, and a fifth CoNiFe layer on the fourth NiFe layer.

4. The magnetic write pole of claim 3, wherein the first NiFe layer has a thickness between about 5 Å and about 25 Å, the second CoNiFe layer has a thickness between about 150 Å and about 350 Å, the third Ta layer has a thickness between about 5 Å and about 20 Å, the fourth NiFe layer has a thickness between about 15 Å and about 60 Å, and the fifth CoNiFe layer has a thickness between about 200 Å and about 300 Å.

5. The magnetic write pole of claim 3, wherein the magnetic seedlayer comprises a sixth corrosion protection layer.

6. The magnetic write pole of claim 5, wherein the sixth layer comprises $Ni_{80}Fe_{20}$.

7. The magnetic write pole of claim 2, wherein the magnetic layers in the magnetic seedlayer have different magnetizations such that the magnetic seedlayer exhibits a magnetization gradient perpendicular to the base.

8. The magnetic write pole of claim of claim 1, wherein the magnetic layer on the seed layer is a magnetic pole with a graded magnetic structure.

9. The magnetic write pole of claim 8, wherein the magnetic layer comprises at least one of 1T NiFe layer, 0.5T NiCu layer, and a 0.3T NiCu layer.

10. The magnetic write pole of claim 8, wherein the graded magnetic structure is a multilayer structure comprised of a first layer comprising a 1T NiFe layer having a thickness from about 25 nm to about 200 nm on the seedlayer, a second layer comprising a 1T NiCu layer having a thickness of from about 25 nm to about 100 nm on the first layer, and a 0.3T NiCu layer having a thickness of from about 25 nm to about 100 nm on the second layer.

11. The magnetic write pole of claim 8, wherein the magnetic layer further comprises a first layer of a high moment alloy comprising at least one of FeCo or CoNiFe and having a thickness of from about 25 nm to about 300 nm.

12. The magnetic write pole of claim 8, wherein the seedlayer is a high moment multilayer magnetic structure.

13. The magnetic write pole of claim 1, wherein the magnetic layer is oriented such that a stationary point on a rotating storage media, parallel to the trapezoidal cross-section, would pass by the front edge trapezoidal cross-section before passing by the top cross-section.

14. The magnetic write pole of claim 1, wherein the top cross-section of the magnetic layer is in the down-track direction from the front edge trapezoidal cross-section.

15. A magnetic pole comprising:
a base;
a seedlayer on the base;
a magnetic layer on the seedlayer with a front edge trapezoidal cross-section having a height h, a bottom width $W_b$, and an aspect ratio $h/W_b$, of about 1:1 to about 10:1, wherein the seedlayer comprises a first NiFe layer, a second CoNiFe layer, a third Ta layer, a fourth NiFe layer, and a fifth CoNiFe layer.

16. The magnetic pole of claim 15, wherein the magnetic layer having the bottom width $W_b$ of less than or equal to about 300 nm.

17. The magnetic pole of claim 16, wherein the magnetic layer having a top width of about 1.25 to 3 times the bottom width $W_b$.

18. The magnetic write pole of claim 15, wherein the seedlayer is a multilayer seedlayer formed of magnetic and nonmagnetic layers.

19. The magnetic pole of claim 18, wherein the magnetic layers in the magnetic seedlayer have different magnetizations such that the magnetic seedlayer exhibits a magnetization gradient perpendicular to the base.

20. The magnetic pole of claim 15, wherein the first NiFe layer has a thickness between about 5 Å and about 25 Å, the second CoNiFe layer has a thickness between about 150 Å and about 350 Å, the third Ta layer has a thickness between about 5 Å and about 20 Å, the fourth NiFe layer has a thickness between about 15 Å and about 60 Å, and the fifth CoNiFe layer has a thickness between about 200 Å and about 300 Å.

21. The magnetic pole of claim 15, wherein the seedlayer comprises a sixth corrosion protection layer.

22. The magnetic pole of claim 21, wherein the sixth layer comprises $Ni_{80}Fe_{20}$.

23. The magnetic pole of claim of claim 15, wherein the magnetic layer on the seedlayer is a magnetic pole with a graded magnetic structure.

24. The magnetic pole of claim 23, wherein the magnetic layer comprises at least one of 1T NiFe layer, 0.5T NiCu layer, and a 0.3T NiCu layer.

25. The magnetic pole of claim 23, wherein the graded magnetic structure is a multilayer structure comprised of a first layer comprising a 1T NiFe layer having a thickness from about 25 nm to about 200 nm on the seedlayer, a second layer comprising a 1T NiCu layer having a thickness of from about 25 nm to about 100 nm on the first layer, and a 0.3T NiCu layer having a thickness of from about 25 nm to about 100 nm on the second layer.

26. The magnetic pole of claim 23, wherein the magnetic layer further comprises a first layer comprised of a high moment alloy comprising at least one of FeCo or CoNiFe and having a thickness of from about 25 nm to about 300 nm.

27. The magnetic pole of claim 23, wherein the seedlayer is a high moment multilayer magnetic structure.

28. The magnetic pole of claim 15, wherein the seedlayer has a vertical magnetization gradient.

29. A magnetic pole prepared by a process comprising:
forming a magnetic seedlayer on a base;
forming a resist layer on the seedlayer;
forming a trench in at least one of the seedlayer and the resist layer defining opposing substantially parallel sidewalls; and
thermally treating the at least one of the resist layer and the seedlayer to alter the trench so that the opposing sidewalls define a front edge trapezoidal cross-section and a top cross-section of a magnetic layer on the seedlayer, the front edge trapezoidal cross-section having a height h, a bottom edge with width $W_b$, and an aspect ratio $h/W_b$, of about 1:1 to about 10:1, the top cross-section being connected to a top edge of the trapezoidal cross-section.

30. The magnetic pole of claim 29, wherein forming the trench further comprises forming the trench in the resist layer and heating the structure for a first amount of time at a first temperature to form a predetermined slope in the substantially parallel sidewalls of the trench.

31. The magnetic pole of claim 30, wherein the process further comprises capping the trench with a removable layer.

32. The magnetic pole of claim 31, wherein the thermally treating further comprises heating the capped trench for a second amount of time at a second temperature to shrink the separation of the opposing sloped sidewalls of the trench.

33. The magnetic pole of claim 32, wherein the process further comprises:
electroplating a magnetic material in the trench; and
removing the resist and a seed material outside the trench.

* * * * *